US006731949B2

(12) United States Patent
Hamabe et al.

(10) Patent No.: US 6,731,949 B2
(45) Date of Patent: *May 4, 2004

(54) METHOD OF CONTROLLING TRANSMISSION POWER IN A CELLULAR TYPE MOBILE COMMUNICATION SYSTEM

(75) Inventors: Kojiro Hamabe, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/082,930

(22) Filed: Oct. 19, 2001

(65) Prior Publication Data

US 2002/0094837 A1 Jul. 18, 2002

Related U.S. Application Data

(63) Continuation of application No. 09/261,410, filed on Mar. 3, 1999, now Pat. No. 6,351,651.

(30) Foreign Application Priority Data

Mar. 3, 1998 (JP) ........................... 10-050631
Mar. 27, 1998 (JP) ........................... 10-080949

(51) Int. Cl.$^7$ ................................. H04O 7/20
(52) U.S. Cl. ........................ 455/522; 455/69
(58) Field of Search .................. 455/68, 69, 13.4, 455/70, 88, 436, 422, 442, 522; 370/331, 332, 318

(56) References Cited

U.S. PATENT DOCUMENTS

| 5,056,109 A | 10/1991 | Gilhousen et al. |
| 5,101,501 A | 3/1992 | Gilhousen et al. |
| 5,216,692 A | * 6/1993 | Ling ........................... 375/130 |
| 5,267,262 A | 11/1993 | Wheatley, III |
| 5,455,967 A | 10/1995 | Amezawa et al. |
| 5,559,790 A | 9/1996 | Yano et al. |
| 5,590,409 A | * 12/1996 | Sawahashi et al. ........... 455/69 |
| 6,070,084 A | 5/2000 | Hamabe |
| 6,118,983 A | * 9/2000 | Egusa et al. ................... 455/69 |
| 6,137,840 A | 10/2000 | Tiedemann, Jr. |
| 6,144,861 A | 11/2000 | Sundelin et al. |
| 6,154,659 A | 11/2000 | Jalali et al. |
| 6,307,844 B1 | * 10/2001 | Tsunehara et al. .......... 370/318 |

FOREIGN PATENT DOCUMENTS

| CA | 2154530 | 1/1996 |
| EP | 0 797 318 A2 | 9/1997 |
| JP | 09-312609 | 12/1997 |
| WO | WO 97/34434 | 9/1997 |
| WO | WO 97/34439 | 9/1997 |

OTHER PUBLICATIONS

Stockholm, IEEE 44th Vehicular Technology Conference, "Tuning the Macro Diversity Performance in a DS–CDMA System", Jun. 8, 1994, pp. 41–45.
TIA/EIA Interrim Standard, Mobile Station–Base Station Compatibility Standard for Dual–Mode Wideband Spread Spectrum Cellular System, TIA/EIA/IS–95–A (Revision of TIA/EIA/IS–95), Telecommunication Industry Association, May 1995, section 6.6.6.2.7.2.

* cited by examiner

Primary Examiner—Jean Gelin
(74) Attorney, Agent, or Firm—Scully, Scott, Murphy & Presser

(57) ABSTRACT

A cellular type mobile communication system comprising a plurality of cells, a plurality of base stations disposed in the respective cells, and a mobile station located in the cells. On reception of a control command for a transmission power from the mobile station, each base station increases or decreases the transmission power in response to the control command. In addition, each base station renews the transmission power so that the transmission power after increased or decreased approaches a predetermined reference power.

65 Claims, 10 Drawing Sheets

BASE STATION

MOBILE STATION

METHOD OF CONTROLLING TRANSMISSION POWER IN A CELLULAR TYPE MOBILE COMMUNICATION SYSTEM

CROSS REFERENCE TO RELATED APPLICATION

This application is a continuation application of U.S. Ser. No. 09/261,410, filed Mar. 3, 1999 now U.S. Pat. No. 6,351,651.

BACKGROUND OF THE INVENTION

This invention relates to a cellular type mobile communication system where a mobile station carries out communication with one or more base stations installed in a service area and, in particular, to a method of controlling transmission power in the cellular type mobile communication system where each base station carries out control of the transmission power in accordance with a control command for the transmission power that the mobile station transmits.

As is well known in the art, various multiple access types have been adapted in a mobile communication system. One of the multiple access type is a CDMA (code division multiple access) cellular type. The CDMA cellular type mobile communication system assigns to each channel with a particular code, transmits to the same repeater a modulated wave to which a carrier having the same carrier frequency is spectrum-spread with the code, establishes code synchronization in each receiving side, and identifies a desired channel. The CDMA cellular type mobile communication system may be called a SSMA (spread spectrum multiple access) cellular type mobile radio communication system.

Inasmuch as a plurality of channels use the same frequency in the CDMA cellular type mobile communication system, a received wave power (a desired wave power) of a signal in a channel becomes an interference wave power for other channels. Accordingly, in a reverse link or an upward channel through which the mobile station transmits an upward channel signal and each base station receives the upward channel signal, when the desired wave power is equal to a predetermined reference power or more, a channel capacity decreases because the interference wave power increases. To prevent this, it is necessary to severely control transmission power of the mobile station. The transmission power control for the reverse link is carried out as follows. That is, the base station measures the desired wave power of the upward channel signal and compares the desired wave power with a control target power. When the desired wave power is larger than the control target power, the base station transmits a reverse control command indicating decrement of a reverse transmission power to the mobile station. When the desired wave power is smaller than the control target power, the base station transmits the reverse control command indicating increment of the reverse transmission power to the mobile station. The mobile station decreases or increases the reverse transmission power for the upward channel signal in accordance with the reverse control command. This method of controlling the reverse transmission power is described in U.S. Pat. No. 5,056,109 which is issued to Gilhousen et al. on Oct. 8, 1991 in detail and which has a title of "Method and apparatus for controlling transmission power in a CDMA cellular mobile telephone system." In order to transmit the reverse control command in this transmission power control, a forward link or a downward channel through which the base station transmits a downward channel signal to the mobile station is used.

On the other hand, a large channel capacity is realized in the forward link by carrying out a forward link transmission power control so that a ratio of the desired wave power to the interference wave power or a signal-to-interference ratio (SIR) has a predetermined value. The transmission power control for the forward link is carried out as follows. That is, the mobile station measures a reception quality for the forward link and compares the reception quality with a control target quality. When the reception quality is higher than the control target quality, the mobile station transmits a forward control command indicating decrement of the forward transmission power to the base station. When the reception quality is lower than the control target quality, the mobile station transmits the forward control command for indicating increment of the forward transmission power to the base station. In addition, the base station increases or decreases the forward transmission power for the downward channel signal in accordance with the forward control command.

However, in the above-mentioned methods, when propagation loss from the mobile station to the base station suddenly increases with moving of the mobile station, the base station may cannot receive the forward control command from the mobile station and the mobile station may cannot receive the reverse control command. Under the circumstances, in a conventional method where the base station controls the forward transmission power in accordance with only the forward control command from the mobile station, the base station does not increase the forward transmission power for the downward channel signal while the base station cannot receive the forward control command from the mobile station when a state where the propagation loss increases continues. In this event, a problem arises that an interruption condition continues in communication between the base station and the mobile station. This is because the mobile station cannot receive the reverse control command from the base station and the mobile station does not increase the reverse transmission power for the upward channel signal of the reverse link.

In addition, generally, a part of user information such as a speech signal or data in a received signal in the base station is encoded with a relatively longer information amount collected so as to correctly decode by carrying out error correction or the like although a received error occurs momentarily. In addition, on decoding, the base station collectively decodes the received signal having the long information amount with a relatively longer time interval. However, in a case where the mobile station moves at a high speed, an error of decision in the forward control command is comparatively much when a high-speed transmission power control is carried out so that the reception quality is maintained at a constant by following variation of a high-speed fading in a propagation path. This is because it is impossible for the decision of the forward control command to obtain the effects of the error correction or the like although the user information may be correctly decoded because it is necessary to momentarily carry out the decision of the forward control command.

Such an error of the decision of the forward control command continuously occurs at a relatively high probability. This is because the error of the decision of the forward control command occurs related to increasing and decreasing of the propagation loss. In addition, when the error of the decision of the forward control command continuously occurs, the base station cannot control the forward transmission power for the downward channel signal in accordance with the forward control command and the mobile station may be put into a state where the mobile station does not correctly receive the downward channel signal. On the other hand, inasmuch as the mobile station cannot receive the reverse control command included in the downward channel signal from the base station, it may be impossible to control the reverse transmission power for the upward channel signal. Under the circumstances, the error of the decision of the forward control command in the upward channel signal occurs frequently and it may be impossible for the base station to correctly receive the user information. In such a case, a problem occurs that the interruption condition continues in the communication between the base station and the mobile station.

In addition, in the cellular type mobile communication system, there is a technique called a soft handover or a soft handoff where a mobile station simultaneously establishes channels with a plurality of base stations at the vicinity of a boundary in cells when the mobile station moves between the cells and changes the channels between the cells. This technique is especially an important technique in the cellular type mobile communication system which adapts the CDMA as the multiple access. Such a soft handover is described in U.S. Pat. No. 5,101,501 which is issued to Gilhousen et al. on Mar. 31, 1992 in detail and which has a title of "Method and system for providing a soft handoff in communications in a CDMA cellular telephone system."

In a case of carrying out the transmission power control for the reverse link or the upward channel during execution of such a soft handover, a plurality of base stations measure the desired wave power of the upward channel signal transmitted from the mobile station and transmit reverse control commands for the reverse transmission power to the mobile station, independently. In addition, the mobile station receives the reverse control commands and preferentially complies with one of the reverse control commands that is indicative of lowering the reverse transmission power when the mobile station receives the reverse control commands which are different from one another. This method is disclosed in "TIA/EIA INTERRIM STANDARD, Mobile Station-Base Station Compatibility Standard for Dual-Mode Wideband Spread Spectrum Cellular System, TIA/EIA/IS-95-A (Revision of TIA/EIA/IS-95)", Telecommunications Industry Association, May 1995, in a section of "6.6.6.2.7.2 Reverse Traffic Channel Power Control During Soft Handoff." As described in the above-reference, by preferentially complying with the reverse control command indicative of lowering the reverse transmission power when the reverse control commands are different from one another among the base stations, it is possible to prevent that the desired wave power of the upward channel signal exceeds the control target power in any base station and results in realizing a high channel capacity in the reverse link or the upward channel. Accordingly, it is important for this method that the mobile station can receive the reverse control commands from all of the base stations which may have the minimum propagation loss for the reverse link or the upward channel.

It is important for the transmission power control for the forward link or the downward channel during execution of the soft handover to carry out so that the mobile station can receive the reverse control commands from all off the base stations which may have the minimum propagation loss for the reverse link or the upward channel.

For this purpose, it may hit one skilled in the art upon a method for controlling the forward transmission power on the forward link or the downward channel so that the desired wave powers of the downward channel signals transmitted from the base stations are equal to one another in the mobile station. However, this method is disadvantageous in that the interference wave power increases and a capacity of the forward link decreases. This is because the base station having the large propagation loss to the mobile station sets a large forward transmission power by its part. As a method for restraining the capacity of the forward link decreasing, there is a method for controlling so that the forward transmission powers of the downward channel signals transmitted from the base stations are equal to one another. This method is described in an article which is contributed by Andersson to Proc. IEEE 44th Vehiclar Technology Conference, (June 1994), pages 41–45, and which has a title of "Tuning the macro diversity performance in a DS-CDMA system."

In this method, when a received power of the reverse control command transmitted from a base station having a small propagation loss to the mobile station is larger than another received power of the reverse control command transmitted from another base station having a large propagation loss and when a difference therebetween is large, there is a high probability that the mobile station fails in receiving the reverse control command from the other base station having the large propagation loss. However, this case is not normally a problem. This is because the reverse transmission power of the reverse link is mainly controlled by the base station having the small propagation loss. On the other hand, when a difference between the propagation losses is small, it is important that the reverse transmission power is controlled in accordance with both of the base stations. Under the circumstances, there is a high probability that it is possible to correctly receive both of the reverse control commands. This is because the mobile station can receive the reverse control commands at nearly equal powers. Accordingly, in order to control the reverse transmission power of the reverse link, the mobile station can receive all of the reverse control commands from the base stations where the propagation loss of the reverse link may become minimum.

In addition, during execution of the soft handover, in a case where the magnitude of the propagation loss from the mobile station to each of the base stations rapidly changes, the base station having the minimum propagation loss carries out transmission at any moment although the base stations carrying out transmission to the mobile station are changed at a high speed in accordance with it. In this event, if the transmission powers of the base stations are not equal to one another, the reception quality may be easily degraded when the base station having the minimum propagation loss changes. This is because the reception quality increases or decreases. However, if the transmission powers of the base stations are equal to one another, it is possible to improve the reception quality more due to a diversity effect where the reception quality is maintained at a constant nearly although the base station having the minimum propagation loss changes.

With the transmission power control for the forward link or the downward channel as described above, the mobile station measures the reception quality of the forward link, compares the reception quality with a control target quality, transmits the forward control command indicating decrement of the forward transmission power to the base stations if the reception quality is higher than the control target quality, and transmits the forward control command indicating decrement of the forward transmission power to the base stations if the reception quality is lower than the control target quality. During execution of the soft handover, a plurality of base stations receive the forward control command which the mobile station transmits. In addition, each of the base stations controls the forward transmission power for the upward channel signal so as to increase or decrease the forward transmission power in accordance with the forward control command. Accordingly, inasmuch as increment or decrement of the forward transmission powers is repeated in the base stations in the similar manner if the base stations have initial values of the forward transmission power that are equal to one another, the forward transmission powers are controlled in the base stations so that the forward transmission powers are equal to one another if each of the base stations receives the forward control command with no error.

However, this method is disadvantageous in that the base station having the large propagation loss frequently fails to receive the forward control command from the mobile station because received power of the forward control command is small although the base station having the minimum propagation loss for the mobile station can almost correctly receive the forward control command from the mobile station. Accordingly, it is difficult to maintain so that the forward transmission powers of the base stations are equal to one another.

Under the circumstances, it will be assumed that the forward transmission power for the base station having the large propagation loss for the mobile station is smaller than the forward transmission power for the base station having the minimum propagation loss for the mobile station caused by failure of reception of the forward control command. In this event, an error of reception may easily occur in the reverse control command for transmission power control of reverse link (the upward channel) that the base station having the large propagation loss for the mobile station transmits. As described above, inasmuch as it is important in the transmission power control for the reverse link that the mobile station can receive the reverse control commands from all of the base stations which may have the minimum propagation loss for the reverse link, such an error of the reception of the reverse control command results in decreasing of a channel capacity for the reverse link. In addition, the reception quality may be easily degraded by decreasing of the above-mentioned diversity effect where a plurality of base stations transmit at the powers which are equal to one another.

On the other hand, it will presumed that the forward transmission power for the base station having the large propagation loss for the mobile station is larger than the forward transmission power for the base station having the minimum propagation loss for the mobile station caused by failure of reception of the forward control command. In this event, problems where interference wave power increases and capacity of the forward link decreases arise. This is because the base station having the large propagation loss for the mobile station sets the forward transmission power large in the manner in a case of the above-mentioned method of controlling the transmission powers of the forward link so that the desired wave powers from the base stations are equal in the mobile station to one another.

Measures are taken that the base station having the large propagation loss for the mobile station fails in receiving of the forward control command from the mobile station due to the large propagation loss. By way of example, Japanese Unexamined Patent Publication of Tokkai No. Hei 9-312, 609 or JP-A 9-312,609 discloses a method of independently controlling the forward transmission power of the forward link in each base station in defiance of the forward control command which has a low reception quality and which has less reliability. However, in this method, the base stations do not transmit at the transmission powers which are equal to one another and it is impossible in this method to resolve the above-mentioned problems.

In addition, JP-A 9-312,609 also describes a method of the steps of gathering, in a combining station (a control station), control signals from a mobile station via base stations to produce a gathered control signal and of controlling, in response to the gathered control signal, a forward transmission power for a forward link in each base station. On realizing a high-speed transmission power control according to this method, this method is disadvantageous in that an amount of transmission for the control signals increases between each of the base station and the control station. On the other hand, if the amount of transmission for the control signals is restricted, this method is advantageous in that it has a large delay and it is difficult to realize the high-speed transmission power control.

SUMMARY OF THE INVENTION

It is therefore an object of the present invention to provide a transmission power control method for a cellular type mobile communication system that is capable of continuously carrying out communication without continuing an interruption state of communication between a base station and a mobile station in a case where a propagation loss rapidly increases between the base station and the mobile station.

It is another object of the present invention to provide a transmission power control method for a cellular type mobile communication system that is capable of continuously carrying out communication without continuing an interruption state of communication between a base station and a mobile station in a case where an error continuously occurs in decision of a forward control command transmitted from the mobile station in the base station.

It is still another object of the present invention to provide a transmission power control method for a cellular type mobile communication system in which a plurality of base stations can carry out transmission at powers which are nearly equal to one another although a reception error occurs in a forward control command for a transmission power control of a forward link transmitted from a mobile station in a base station during execution of a soft handover without excessively increasing an amount of transmission of control signals between the base station and a control station.

It is yet another object of the present invention to provide a transmission power control method for a cellular type mobile communication system of the type described, that is capable of obtaining a high capacity in both a reverse link and a forward link.

Other objects of this invention will become clear as the description proceeds.

According to this invention, while a mobile station establishes a channel with one or more base stations, each base station repeatedly carries out a transmission power control operation for, on reception of a control command from the mobile station, increasing or decreasing a transmission power in response to the control command and for renewing the transmission power so that the transmission power of the base station after increased or decreased approaches a predetermined reference power.

For this end, while the mobile station establishes the channel with one or more base stations, each base station increases or decreases, on reception of the control command from the mobile station, the transmission power in response to the control command and renews the transmission power so that a difference ($P_a$–C) between the transmission power $P_a$ of the base station after increased or decreased and a predetermined transmission power C is r times as large as a difference ($P_b$–C) between the transmission power $P_b$ before renewed and the predetermined reference power C, namely, $$P_a = r(P_b - C) + C$$

where r represents a coefficient which is not less than zero and which is less than one, namely, (0≦r<1).

A value of the coefficient r is determined so that a product (Pmax–Pmin) (1–r) of a difference (Pmax–Pmin) between a maximum value Pmax and a minimum value Pmin in a control range for the transmission power P and another coefficient (1–r) is less than a changing step ΔP for the transmission power in a case of increasing or decreasing the transmission power in response to the control command, namely, $$(P\mathrm{max} - P\mathrm{min})(1-r) < \Delta P.$$

Specifically, on describing the gist of an aspect of this invention, it is possible to be understood that a method is of controlling transmission power in a cellular type mobile communication system comprising a plurality of cells, a plurality of base stations disposed in the respective cells, and a mobile station located in the cells. The mobile station carries out communication with at least one base stations by establishing a channel between the mobile station and the at least one base station. According to the aspect of this invention, the above-understood method comprises the steps of repeatedly carrying out a first transmission power control operation where the mobile station transmits a control command for the transmission power to the at least one base station while the mobile station establishes the channel with the at least one base station and the at least one base station receives the control command to change the transmission power in response to the control command, and of repeatedly carrying out a second transmission power control operation which renews the transmission power in the at least one base station so that an absolute value of a difference between a predetermined reference power in dB and the transmission power in dB decreases at a predetermined rate.

In addition, in the method of controlling the transmission power in the cellular type mobile communication system, the predetermined reference power may be equal to a maximum transmission power.

Furthermore, according to this invention, while a mobile station establishes channels between the mobile station and a plurality of base stations, the base station repeats a transmission control operation for increasing or decreasing, on reception of a control command for transmission power from the mobile station, the transmission power in response to the control command, and for renewing the transmission power so that the transmission powers in the plurality of base stations after increased or decreased have less difference and approach a reference power which is defined in the plurality of base stations in common.

For this purpose, while the mobile station establishes the channels with the plurality of base stations, each base station increases or decreases, on reception of the control command from the mobile station, the transmission power in response to the control command and renews the transmission power so that a difference ($P_a$–C) between the transmission power $P_a$ of the base station after increased or decreased and a predetermined transmission power C defined in the plurality of base stations in common is r times as large as a difference ($P_b$–C) between the transmission power $P_b$ before renewed and the predetermined reference power C, namely, $$P_a = r(P_b - C) + C,$$

where r represents a coefficient which is not less than zero and which is less than one, namely, (0≦r<1).

In addition, in the method of controlling the transmission power in the cellular type mobile communication system according to this invention, the coefficient r is determined so that a product (Pmax–Pmin)(1–r) of a difference (Pmax–Pmin) between a maximum value Pmax and a minimum value Pmin in a control range for the transmission power P and another coefficient (1–r) is less than a changing step ΔP for the transmission power in a case of increasing or decreasing the transmission power in response to the control command, namely, $$(P\mathrm{max} - P\mathrm{min})(1-r) < \Delta P.$$

Specifically, on describing the gist of an aspect of this invention, it is possible to be understood that a method is of controlling transmission power in a cellular type mobile communication system comprising a plurality of cells, a plurality of base stations disposed in the respective cells, and a mobile station located in the cells. The mobile station carries out communication with one or more base stations by establishing one or more channels between the mobile station and the one or more base stations. According to the aspect of this invention, the above-understood method comprises the steps of repeatedly carrying out a first transmission power control operation where the mobile station transmits a control command for the transmission power to each of the plurality of base stations while the mobile station establishes the channels with the plurality of base stations and each of the plurality of base stations receives the control command to change the transmission power in response to the control command, and of repeatedly carrying out a second transmission power control operation which renews the transmission power in each of the plurality of base stations so that an absolute value of a difference between a reference power in dB defined in the plurality of base stations in common and the transmission power in dB decreases at a common rate among the plurality of base stations.

In addition, in the method of controlling the transmission power in the cellular type mobile communication system, the reference power may be equal to a maximum transmission power.

Furthermore, in the method of controlling the transmission power in the cellular type mobile communication system, the reference power may be equal to an intermediate power between a maximum transmission power in dB and a minimum transmission power in dB.

In addition, in the method of controlling the transmission power in the cellular type mobile communication system, the reference power may be equal to a minimum transmission power.

In addition, in the method of controlling the transmission power in the cellular type mobile communication system, the plurality of base stations calculate statistical values of the transmission power to transmit the statistical values to a control station. The control station calculates a reference value indicating the reference power using the statistical values of the plurality of base stations to send the reference value to the plurality of base stations. Each of the plurality of the base stations uses the reference power having the reference value sent from the control station.

Furthermore, in the method of controlling the transmission power in the cellular type mobile communication system, the control station may use, as the reference value, a maximum one of the statistical values.

In addition, in the method of controlling the transmission power in the cellular type mobile communication system, the control station may determine the common rate in accordance with mutual differences among the statistical values of the plurality of base stations.

Furthermore, in the method of controlling the transmission power in the cellular type mobile communication system, the control station may determine frequency for renewing the transmission power by the common rate in accordance with mutual differences among the statistical values of the plurality of base stations.

In addition, in the method of controlling the transmission power in the cellular type mobile communication system, the mobile station may have an accumulated control value for the transmission power in the base stations. In this event, the mobile station renews the accumulated control value on transmitting the control command for the transmission power to the base station. The mobile station transmits the accumulated control value to the plurality of base stations at a time interval which is longer than a repetition time interval of a changing operation for the transmission power. Each of the plurality of base stations determines the reference power using the accumulated control value received therein to use the reference power.

Furthermore, in the method of controlling the transmission power in the cellular type mobile communication system, the plurality of base stations may simultaneously carry out a renewal of the respective transmission powers.

A base station in a cellular type mobile communication system according to this invention repeatedly carries out, while a mobile station establishes a channel with one or more base stations, a transmission power control operation for, on reception of a control command from the mobile station, increasing or decreasing a transmission power in response to the control command and for renewing the transmission power so that the transmission power of the base station after increased or decreased approaches a predetermined reference power.

For this end, while the mobile station establishes the channel with one or more base stations, the base station increases or decreases, on reception of the control command from the mobile station, the transmission power in response to the control command and renews the transmission power P so that a difference ($P_a$−C) between the transmission power $P_a$ of the base station after increased or decreased and a predetermined transmission power C is r times as large as a difference ($P_b$−C) between the transmission power $P_b$ before renewed and the predetermined reference power C, namely, $$P_a = r(P_b - C) + C,$$

where r represents a coefficient which is not less than zero and which is less than one, namely, (0≦r<1).

The coefficient r may have a value determined so that a product (Pmax−Pmin)(1−r) of a difference (Pmax−Pmin) between a maximum value Pmax and a minimum value Pmin in a control range for the transmission power P and another coefficient (1−r) is less than a changing step ΔP for the transmission power in a case of increasing or decreasing the transmission power in response to the control command, namely $$(P\text{max} - P\text{min})(1-r) < \Delta P.$$

Specifically, on describing the gist of an aspect of this invention, it is possible to be understood that a base station is for use in a cellular type mobile communication system comprising a plurality of cells, a plurality of base stations disposed in the respective cells, and a mobile station located in the cells. The mobile station carries out communication with at least one base stations by establishing a channel between the mobile station and the at least one base station. According to the aspect of this invention, the above-understood base station comprises a first transmission power controller for repeatedly carrying out a first transmission power control operation for changing the transmission power in response to a control command for, the transmission power that is received from the mobile station while the mobile station establishes the channel with the at least one base station, and a second transmission power controller for repeatedly carrying out a second transmission power control operation for renewing the transmission power so that an absolute value of a difference between a predetermined reference power in dB and the transmission power in dB decreases at a predetermined rate.

In addition, in the base station in the cellular type mobile communication system, the predetermined reference power may equal to a maximum transmission power.

DESCRIPTION OF THE PREFERRED EMBODIMENTS

Figure 1:
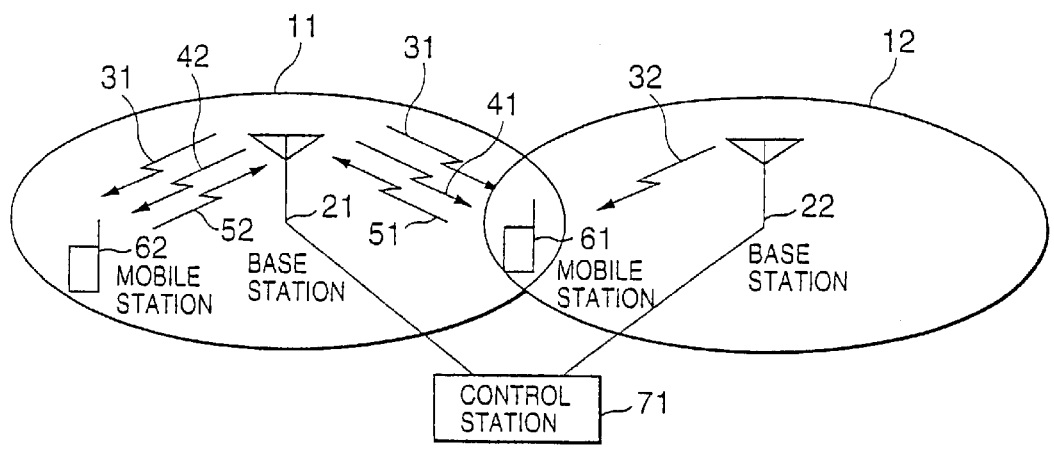
FIG. 1 is a block diagram of a cellular type mobile communication system to which a transmission power control method according to a first embodiment of the present invention is applicable.

Referring to FIG. 1, description will proceed to a cellular type mobile communication system to which a transmission power control method according to an embodiment of the present invention is applicable. The illustrated cellular type mobile communication system has a service area divided into first and second cells 11 and 12 in which first and second base stations 21 and 22 are disposed, respectively, and in which first and second mobile stations 61 and 62 lie. In other words, the first base station 21 covers the first cell 11 while the second base station 22 covers the second cell 12. In the example being illustrated, the first mobile station 61 lies in an area which is overlapped in the first and the second cells 11 and 12 while the second mobile station 62 lies in the first cell 11. The first and the second base stations 21 and 22 are connected to a control station 71 which is connected to a communication network (not shown) including other control stations. Although illustration is omitted from FIG. 1, the cellular type mobile communication system comprises other lots of base stations disposed in other cells in which a lot of mobile stations lie.

Figure 2:
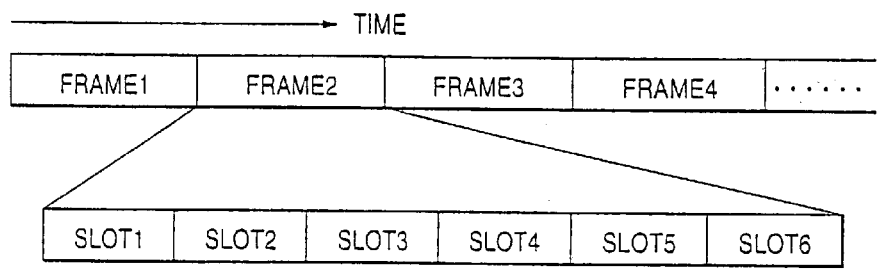
FIG. 2 shows a frame format of a signal for use in the cellular type mobile communication system illustrated in FIG. 1.

The first and the second base stations 21 and 22 transmit first and second pilot signals 31 and 32 at a constant transmission power, respectively. Each of the first and the second mobile stations 61 and 62 comprises a pilot signal power measurement unit (which will later be described) for measuring received powers of the first and the second pilot signals 31 and 32. The mobile station switches the pilot signal power measurement unit for every time slot as shown in FIG. 2 to make the pilot signal power measurement unit measure the received powers of pilot signals from a plurality of base stations every frame. Inasmuch as one frame comprises six slots in the example of FIG. 2, the pilot signal power measurement unit may measure the received powers of a maximum of six pilot signals from six base stations.

Figure 3:
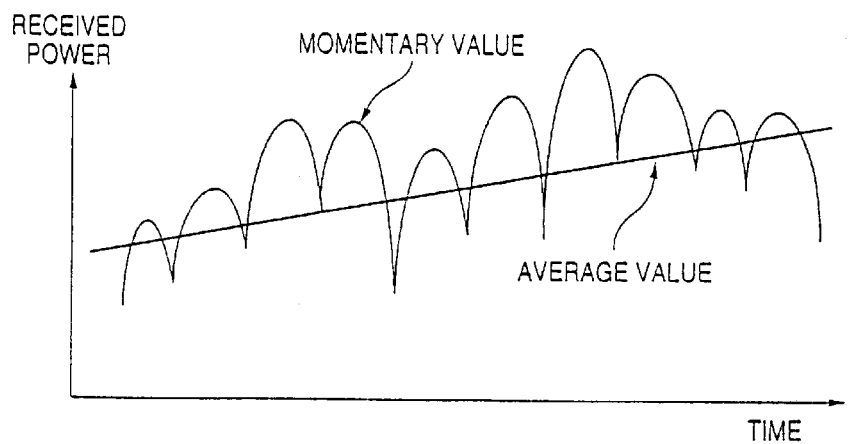
FIG. 3 is a view showing variation of received power due to a fading.

When the mobile station moves, the received power of the pilot signal has a momentary value which varies at a short period with time, as shown in FIG. 3. Accordingly, the mobile station calculates an average value of the received power in each time slot by averaging the received power in the frames which correspond in number to a sufficiently long time compared with a variation period of the momentary value of the received power in a case where the mobile station moves.

On carrying out communication, the mobile station establishes a channel with the base station having a maximum average value of the received power of the pilot signal to start the communication. During communication, the received powers of the pilot signals may vary with movement of the mobile station, the mobile station carries out a renewal of the base station to be established with the channel if the base station having the maximum average value of the received power of the pilot signal changes.

It will be assumed that the received power of the first pilot signal 31 is maximum in the first mobile station 61. In this event, the first mobile station 61 establishes the channel with the first base station. A first downward channel signal 41 is a signal which is transmitted from the first base station 21 to the first mobile station 61 via a forward link while a first upward channel signal 51 is a signal which is transmitted from the first mobile station 61 to the first base station 21 via a reverse link. On the other hand, inasmuch as the received power of the first pilot signal 31 is maximum in the second mobile station 62, the second mobile station 62 establishes the channel with the first base station 21. In this event, the second mobile station 62 carries out communication with the first base station 21 using a second downward channel signal 42 and a second upward channel signal 52 via the forward link and the reverse link.

As shown in FIG. 2, each of the first and the second downward channel signals 41 and 42 and the first and the second upward channel signals 51 and 52 is composed of repetition of the frame having a constant time interval and each frame comprises a plurality of time slots each having a shorter time interval. Each time slot of the downward channel signal includes a reverse control command of a reverse transmission power for the upward channel signal while each time slot of the upward channel signal includes a forward control command of a forward transmission power for the downward channel signal.

Figure 4:
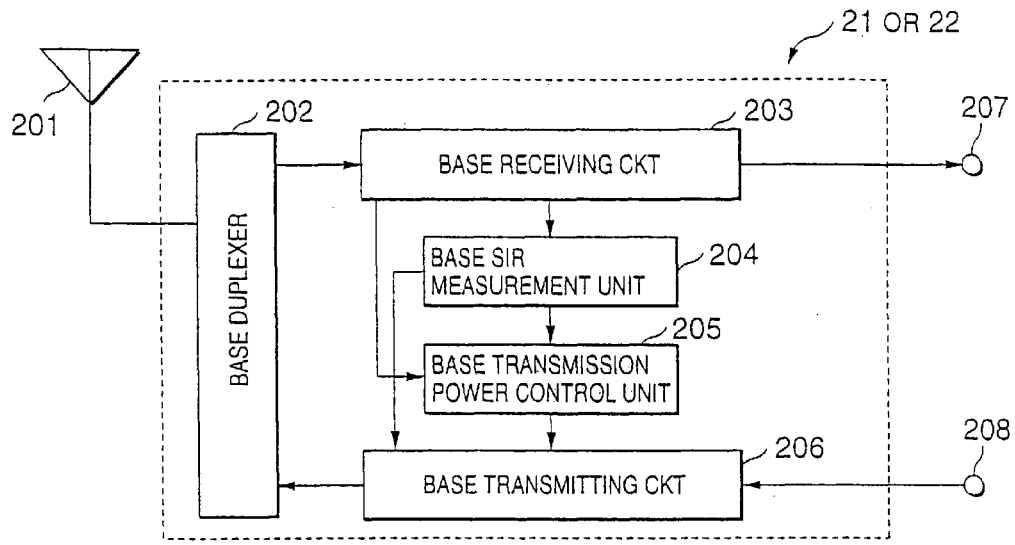
FIG. 4 is a block diagram of a base station for use in the cellular type mobile communication system illustrated in FIG. 1.

Turning to FIG. 4, description will proceed to the base station which is used as each of the first and the second base stations 21 and 22. The base station comprises a base antenna 201, a base duplexer 202, a base receiving circuit 203, a base signal-to-interference ratio (SIR) measurement unit 204, a base transmission power control unit 205, a base transmitting circuit 206, a base output terminal 207, and a base input terminal 208.

The base antenna 201 is connected to the base duplexer 202 which is connected to the base receiving circuit 203 and the base transmitting circuit 205. The base receiving circuit 203 is connected to the base SIR measurement unit 204, the base transmission power control unit 205, and the base output terminal 207 while the base transmitting circuit 206 is connected to the base transmission power control unit 205 and the base input terminal 208. The base SIR measurement unit 204 is connected to the base transmission power control unit 205.

Figure 5:
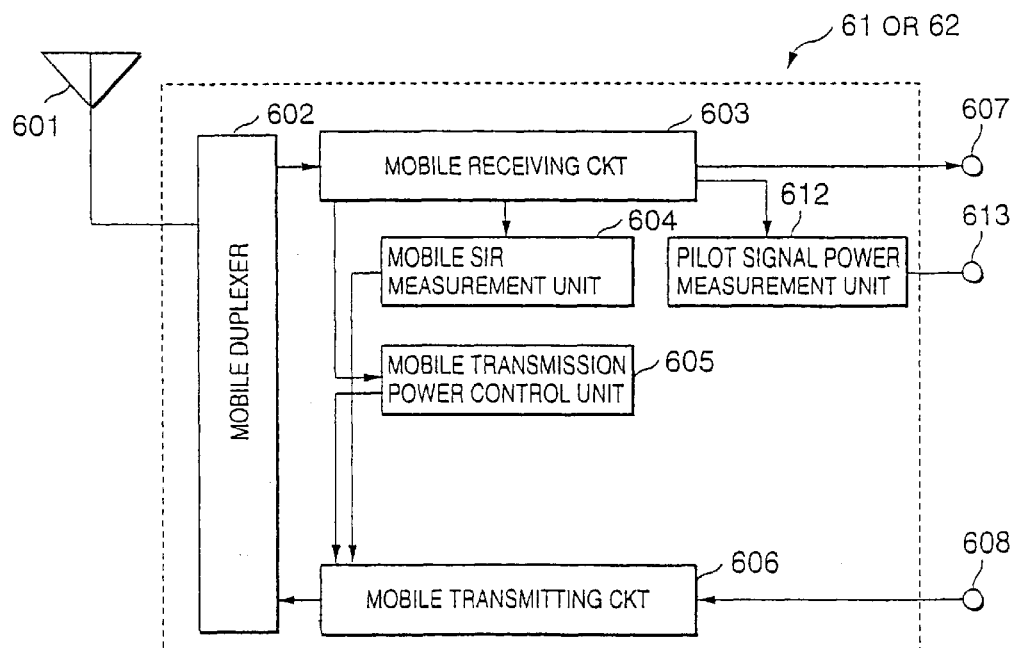
FIG. 5 is a block diagram of a mobile station for use in the cellular type mobile communication system illustrated in FIG. 1.

Turning to FIG. 5, description will proceed to the mobile station which is used as the first and the second mobile stations 61 and 62. The mobile station comprises a mobile antenna 601, a mobile duplexer 602, a mobile receiving circuit 603, a mobile SIR measurement unit 604, a mobile transmission power control unit 605, a mobile transmitting circuit 606, a mobile output terminal 607, a mobile input terminal 608, a pilot signal power measurement unit 612, and a pilot signal power terminal 613.

The mobile antenna 601 is connected to the mobile duplexer 602 which is connected to the mobile receiving circuit 603 and the mobile transmitting circuit 605. The mobile receiving circuit 603 is connected to the mobile SIR measurement unit 604, the mobile transmission power control unit 605, the mobile output terminal 607, the pilot signal power measurement unit 612, and the mobile transmitting circuit 606. The pilot signal power measurement unit 612 is connected to the pilot signal power terminal 613.

Description will at first be made about forward link power control or downward channel power control.

In the mobile station, the downward channel signal transmitted from the base station is received in the mobile receiving circuit 603 through the mobile antenna 601 and the mobile duplexer 602. Whenever the mobile receiving circuit 603 receives the time slots of the downward channel signal, the mobile SIR measurement unit 604 measures a downward signal-to-interference ratio (SIR) for the downward channel signal to obtain a measured downward SIR value indicative of the downward SIR. The mobile SIR measurement unit 604 compares the measured downward SIR value with a target downward SIR value. When the measured downward SIR value is smaller than the target downward SIR value, the mobile SIR measurement unit 604 produces the forward control command indicative of increment of the forward transmission power. When the measured downward SIR value is larger than the target downward SIR value, the mobile SIR measurement unit 604 produces the forward control command indicative of decrement of the forward transmission power. The forward control command is supplied to the mobile transmitting circuit 606. The mobile transmitting circuit 606 transmits, to the base station through the mobile duplexer 602 and the mobile antenna 602, the upward channel signal including the forward control command every time slot.

In the base station, the upward channel signal transmitted from the mobile station is received in the base receiving circuit 203 through the base antenna 201 and the base duplexer 202. Whenever the base receiving circuit 203 receives the time slots of the upward channel signal, the base receiving circuit 203 sends, to the base transmission power control unit 205, the forward control commands included in the time slots. The base transmission power control unit 205 calculates the forward transmission power for the downward channel signal every time slot using the forward control commands sent from the base receiving circuit 203 to send a forward transmission power control signal indicative of the forward transmission power to the base transmitting circuit 206. Responsive to the forward transmission power control signal, the base transmitting circuit 206 sets the forward transmission power for the downward channel signal to a value indicated by the forward transmission power control signal sent from the base transmission power control unit 205. In addition, the base station transmits, to one or more mobile stations through the base duplexer 202 and the base antenna 201, the downward channel signal generated by the base transmitting circuit 206.

Description will be made about reverse link power control or upward channel power control.

In the base station, the upward channel signal transmitted from the mobile station is received in the base receiving circuit 203 through the base antenna 201 and the base duplexer 202. Whenever the base receiving circuit 203 receives the time slots of the upward channel signal, the base SIR measurement unit 204 measures an upward signal-to-interference ratio (SIR) for the upward channel signal to obtain a measured upward SIR value indicative of the upward SIR. The base SIR measurement unit 204 compares the measured upward SIR value with a target upward SIR value. When the measured upward SIR value is smaller than the target upward SIR value, the base SIR measurement unit 204 produces an upward control command indicative of increment of the reverse transmission power. When the measured upward SIR value is larger than the target upward SIR value, the base SIR measurement unit 604 produces the reverse control command indicative of decrement of the reverse transmission power. The reverse control command is supplied to the base transmitting circuit 206. The base transmitting circuit 206 transmits, to one or more mobile stations through the base duplexer 202 and the base antenna 201, the downward channel signal including the reverse control command every time slot.

In the mobile station, the downward channel signal transmitted from the base station is received in the mobile receiving circuit 603 through the mobile antenna 601 and the mobile duplexer 602. Whenever the mobile receiving circuit 603 receives the time slots of the downward channel signal, the mobile receiving circuit 603 sends, to the mobile transmission power control unit 605, the reverse control commands included in the time slots. The mobile transmission power control unit 605 calculates the reverse transmission power for the upward channel signal every time slot using the reverse control commands sent from the mobile receiving circuit 603 to send a reverse transmission power control signal indicative of the reverse transmission power to the mobile transmitting circuit 606. Responsive to the reverse transmission power control signal, the mobile transmitting circuit 606 sets the reverse transmission power for the upward channel signal to a value indicated by the reverse transmission power control signal sent from the mobile transmission power control unit 605. In addition, the mobile station transmit, to the base station through the mobile duplexer 602 and the mobile antenna 601, the upward channel signal generated by the mobile transmitting circuit 605.

Figure 6:
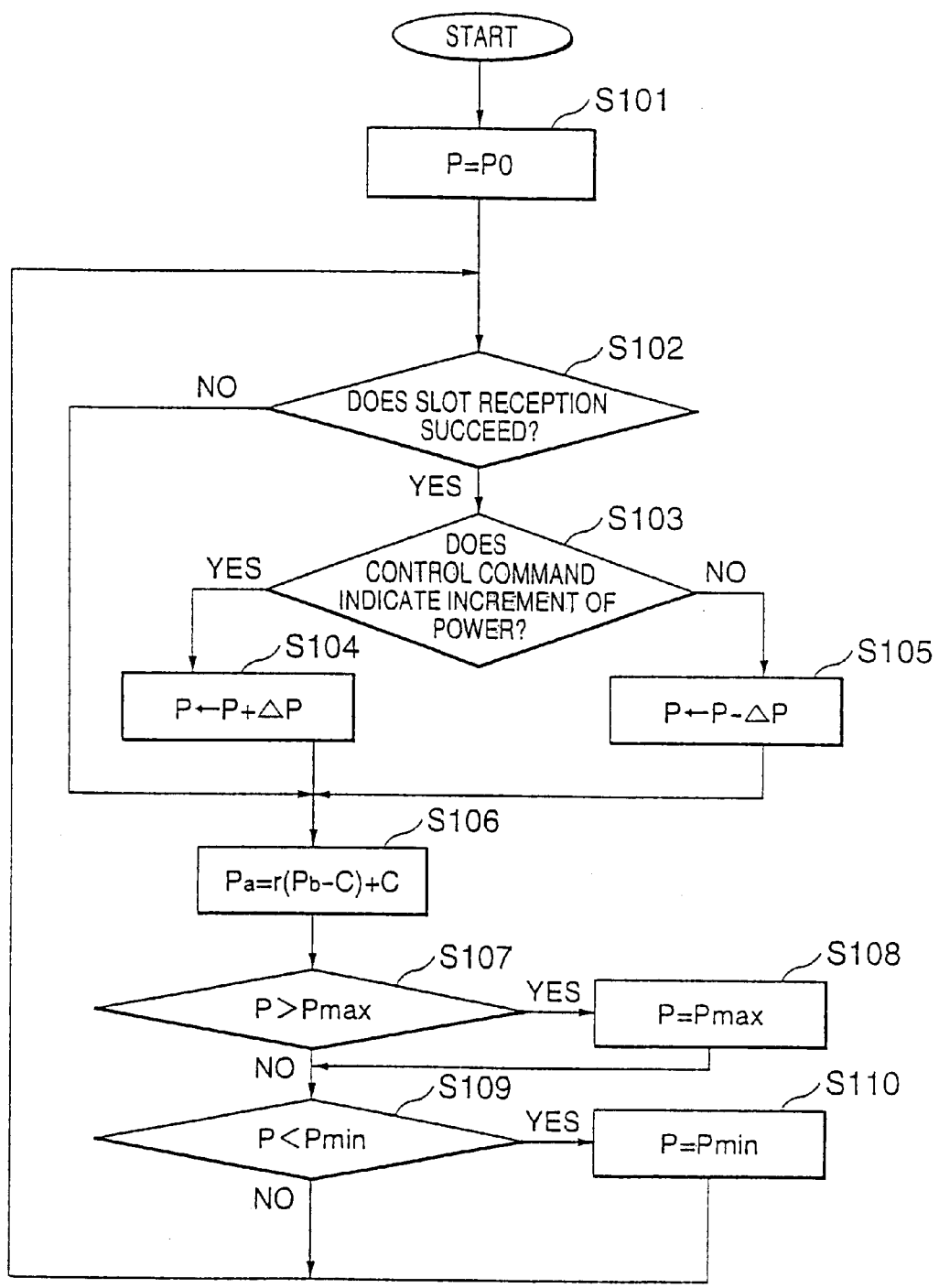
FIG. 6 is a flow chart for use in describing the transmission power control method in the base station according the first embodiment of the present invention.

Referring to FIG. 6 in addition to FIGS. 1 and 4, description will be made about a transmission power control for the downward channel signal by the base transmission power control unit 205 of the base station. It will be assumed that the forward transmission power P is represented by decibel (dB).

When the base station starts communication, the base transmission power control unit 205 sets the forward transmission power P for the downward channel signal to an initial value P0 at a step S101. The initial value P0 may be any value in a control range of the forward transmission power. The step S101 proceeds to a step S102 at which the base transmission power control unit 205 determines whether reception of a time slot succeeds or fails whenever the base receiving circuit 203 receives the time slot of the upward channel signal transmitted from the mobile station. More specifically, the base transmission power control unit 205 determines that the reception of the time slot succeeds when the time slot has the measured upward SIR value which is not less than a predetermined value. On the other hand, the base transmission power control unit 205 determines that the reception of the time slot fails when the time slot has the measured upward SIR value which is less than the predetermined value.

When the reception of the time slot succeeds, the step S102 is followed by a step S103 at which the base transmission power control unit 205 determines whether the forward control command in the time slot indicates increment or decrement of the forward transmission power for the forward link. When the forward control command in the time slot indicates increment of the forward transmission power for the forward link, the step S103 is succeeded by a step S104 at which the base transmission power control unit 205 makes the base transmitting circuit 206 increase the forward transmission power P for the forward link by a predetermined value $\Delta P$, namely, $$P \leftarrow P + \Delta P.$$

The predetermined value $\Delta P$ is called as a changing step. On the other hand, when the forward control command in the time slot indicates decrement of the forward transmission power for the forward link, the step S103 proceeds to a step S105 at which the base transmission power control unit 205 makes the base transmitting circuit 206 decrease the forward transmission power P for the forward link by the predetermined value $\Delta P$, namely, $$P \leftarrow P - \Delta P.$$

When the reception of the time slot fails at the step S102, the S102 is followed by a step S106 which follows the steps S104 and S105. At the step S106, the base transmission power control unit 205 renews the forward transmission power P so that a value $r(P_b-C)$ obtained by multiplying a difference between the forward transmission power $P_b$ before renewed and a predetermined reference transmission power C by a coefficient r is equal to a difference between the forward transmission power $P_a$ after renewed and the predetermined reference transmission power C. That is:

$$P_a=r(P_b-C)+C.$$

The coefficient r is referred to as a predetermined rate. The step S106 is succeeded by a step S107 at which the base transmission power control unit 205 determines whether or not the forward transmission power P is larger than a maximum transmission power Pmax. When the forward transmission power P is larger than the maximum transmission power Pmax, namely, $$P>P\text{max},$$

the step S107 proceeds to a step S108 at which the base transmission power control unit 205 sets the forward transmission power P to the maximum transmission power Pmax, namely, $$P=P\text{max}.$$

When the forward transmission power P is not larger than the maximum transmission power Pmax, the step S107 is followed by a step S109 which follows the step S108. At the step S109, the base transmission power control unit 205 determines whether or not the forward transmission power P is smaller than a minimum transmission power Pmin. When the forward transmission power P is smaller than a minimum transmission power Pmin, namely, $$P<P\text{min},$$

the step S109 proceeds to a step S110 at which the base transmission power control unit 205 sets the forward transmission power P to the minimum transmission power Pmin, namely, $$P=P\text{min}.$$

The base transmission power control unit 205 turns from No in the step S109 and the step S110 to the step S102.

At any rate, a combination of the base receiving circuit 203 and the base transmission power control unit 205 serves at the steps S102 to S105 as a first transmission power controller for repeatedly carrying out changing the transmission power P in response to the control command received from the mobile station while the mobile station establishes the channel with at least one base station. In addition, the base transmission power control unit 205 acts at the step S106 as a second transmission power controller for repeatedly carrying out a second transmission power control operation for renewing the transmission power P so that the transmission power $P_a$ for the base station approaches the predetermined reference power C. In other words, the base transmission power control unit 205 is operable at the step S106 as the second transmission power controller for repeatedly carrying out the second transmission power control operation for renewing the transmission power P so that an absolute value $|P-C|$ of a difference (P-C) between the predetermined reference power C in dB and the transmission power P in dB decreases at the predetermined rate r.

The predetermined reference transmission power C is set to a relatively high value in the control range of the forward transmission power P so that almost all mobile stations in the cell can receive the downward channel signal when the base station sets the forward transmission power P for the downward channel signal to the predetermined reference transmission power C. In the example being illustrated, the predetermined reference transmission power C is equal to the maximum transmission power Pmax, namely, $$C=P\text{max}.$$

The coefficient r is set within a range between zero, inclusive, and one, exclusive. Specifically, the coefficient r is set so that a changing amount $\{r(P-C)+C\}-P$, namely, $(1-r)(C-P)$ of the forward transmission power P in the step S106 is smaller than the predetermined value $\Delta P$ of the forward transmission power P in the steps S104 and S105, namely, $(1-r)(C-P)<\Delta p$. This is because it is necessary to increase or decrease the forward transmission power P in accordance with the forward control command transmitted from the mobile station. That is, the coefficient r has a setting range as follows:

$$1-\Delta P/(C-P)<r<1.$$

Inasmuch as the predetermined reference transmission power C is equal to the maximum transmission power Pmax in the example being illustrated, the setting range of the coefficient r becomes as follows:

$$1-\Delta P/(P\text{max}-P)<r<1.$$

It will be assumed that a difference (Pmax-Pmin) between the maximum transmission power Pmax and the minimum transmission power Pmin is equal to 10 dB and the predetermined value $\Delta P$ is equal to 1 dB. Under the circumstances, the setting range of the coefficient r becomes as follows:

$$0.9<r<1.$$

Desirably, the coefficient r may be set to about 0.95. This is because the step S106 does not have effect if the coefficient r is nearly equal to one.

According to the above-mentioned transmission power control method, it is possible to continue communication without continuing a state where communication between the base station and the mobile station interrupts although a propagation loss from the mobile station to the base station rapidly increases with moving of the mobile station. More specifically, it will be presumed that the propagation loss from the mobile station to the base station rapidly increases. In this event, the base station cannot receive the forward control command included in the time slot because the base station fails to receive the upward channel signal. The base station sets the forward transmission power P to approach the predetermined reference transmission power C when the base station fails to receive the time slot of the upward channel signal. Accordingly, the forward transmission power P will be nearly equal to the predetermined reference transmission power C when failure in reception of the time slot continues. In addition, inasmuch as the predetermined reference transmission power C is set to the relatively high value in the control range of the forward transmission power P, the mobile station may receive the downward channel signal transmitted from the base station if the forward transmission power P will be nearly equal to the predetermined reference transmission power C. The base station transmits the reverse control command indicative of increment of the reverse transmission power to the mobile station because the reverse SIR value for the upward channel signal is small when the base station fails to receive the upward channel signal. When the mobile station can receive the downward channel signal transmitted from the base station, the mobile station increases the reverse transmission power for the upward channel signal in response to the reverse control command indicative of the increment of the reverse transmission power. Accordingly, the base station may receive the upward channel signal. In the manner as described above, it is possible to carry out a bidirectional communication between the base station and the mobile station again and it is possible to continue communication without continuing the interruption state in the communication between the base station and the mobile station.

Inasmuch as the forward transmission power P is renewed to the value r(P−C)+C in the step S104, the difference (P−C) becomes r times every time unit of the time slot. It will be assumed that a momentary forward transmission power is equal to P1. After renewal in the step S106 is repeated n times in a case where the forward transmission power P is not changed in the steps S104 and S105, the difference (P−C) becomes a value obtained by multiplying (P1−C) by the $n^{th}$ power of the coefficient r, where n represents a positive integer which is not less than two. Inasmuch as the coefficient r is less than one, the $n^{th}$ power of the coefficient r approaches zero gradually. Accordingly, the forward transmission power P approaches the predetermined reference transmission power C by renewal in the step S106.

It will be assumed that the base station cannot correctly control the forward transmission power for the downward channel signal because decision error of the forward control command occurs continuously in the base station and then the mobile station cannot correctly receive the downward channel signal. Under the circumstance, in general, the decision error of the forward control command occurs at random and then a probability that the forward control command indicative of increment of the forward transmission power occurs is nearly equal to a probability that the forward control command indicative of decrement of the forward transmission power occurs. Accordingly, the forward transmission power does not increase or decrease in average at the steps S104 and S105. In this case, according to the above-mentioned transmission power control method, the forward transmission power P approaches the predetermined reference transmission power C and the mobile station may receive the downward channel signal transmitted from the base station. As a result, in the similar manner of a case where the propagation loss from the mobile station to the base station rapidly increases, it is possible to carry out a bidirectional communication between the base station and the mobile station and it is possible to continue the communication without continuing the interrupt condition in the communication between the base station and the mobile station.

Although the mobile station establishes the channel with only one base station in the above-mentioned embodiment, the mobile station may establishes two or more channels with two or more base stations to execute a soft handover. In this case, when the propagation loss from the mobile station to the base station rapidly increases, it is possible to continue communication in a similar manner by controlling the forward transmission power in each base station in the similar manner as the above-mentioned embodiment.

Figure 7:
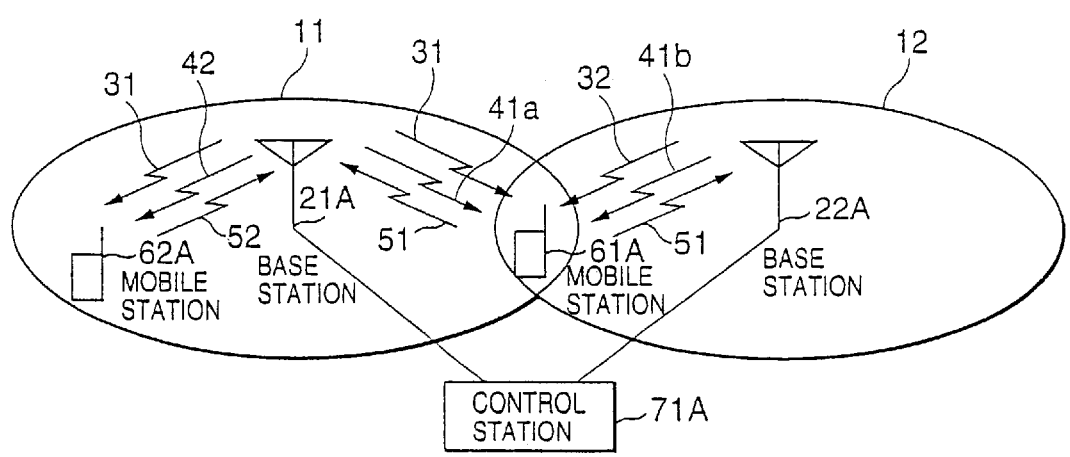
FIG. 7 is a block diagram of a cellular type mobile communication system to which a transmission power control method according to other embodiments of the present invention is applicable.

Referring to FIG. 7, description will proceed to a cellular type mobile communication system to which a transmission power control method according to other embodiments of the present invention are applicable. The illustrated cellular type mobile communication system has a service area divided into the first and the second cells 11 and 12 in which first and second base stations 21A and 22A are disposed, respectively, and in which first and second mobile stations 61A and 62A lie. In other words, the first base station 21A covers the first cell 11 while the second base station 22A covers the second cell 12. In the example being illustrated, the first mobile station 61A lies in an area which is overlapped in the first and the second cells 11 and 12 while the second mobile station 62A lies in the first cell 11. The first and the second base stations 21A and 22A are connected to a control station 71A which is connected to a communication network (not shown) including other control stations. Although illustration is omitted from FIG. 7, the cellular type mobile communication system comprises other lots of base stations disposed in other cells in which a lot of mobile stations lie.

The first and the second base stations 21A and 22A transmit the first and the second pilot signals 31 and 32 at a constant transmission power, respectively. Each of the first and the second mobile stations 61A and 62A comprises a pilot signal power measurement unit (which will later be described) for measuring received powers of the first and the second pilot signals 31 and 32. The mobile station switches the pilot signal power measurement unit for every time slot as shown in FIG. 2 to make the pilot signal power measurement unit measure the received powers of pilot signals from a plurality of base stations every frame. Inasmuch as one frame comprises six slots in the example of FIG. 2, the pilot signal power measurement unit may measure the received powers of a maximum of six pilot signals from six base stations.

When the mobile station moves, the received power of the pilot signal has a momentary value which varies at a short period with time, as shown in FIG. 3. Accordingly, the mobile station calculates an average value of the received power in each time slot by averaging the received power in the frames which correspond in number to a sufficient long time compared with a variation period of the momentary value of the received power in a case where the mobile station moves.

On carrying out communication, the mobile station establishes a channel with the base station having a maximum average value off the received power of the pilot signal to start the communication. The base station having the maximum average value of the received power of the pilot signal is herein called a main base station. When there is another base station having a larger average value of the received power of the pilot signal compared with a value obtained by subtracting a predetermined handover threshold value from the maximum average value of the received power of the pilot signal in the main base station, the mobile station establishes another channel with the other base station to carry out communication with the other base station. The other base station having the larger average value of the received power of the pilot signal is referred to an auxiliary base station. Although the received powers of the pilot signals may vary with moving of the mobile station during communication, the mobile station carries out renewal of the main base station and the auxiliary base station (1) when the base station having the maximum average value of the received power of the pilot signal changes, (2) when the auxiliary base station is not satisfied with a condition for the auxiliary base station, or (3) when another base station is satisfied with the condition for the auxiliary base station.

It will be assumed that the received power of the first pilot signal 31 is maximum in the first mobile station 61A and a difference between the received power of the first pilot signal 31 and the received power of the second pilot signal 32 is within the handover threshold value in the first mobile station 61A. In this event, the first base station 21A is the main base station for the first mobile station 61A while the second base station 22A is the auxiliary base station for the first mobile station 61A. Accordingly, the first mobile station 61A establishes the channels with the first and the second base stations 21A and 22A. A first main downward channel signal 41a is a signal which is transmitted from the first base station 21A to the first mobile station 61A via a forward link. A first auxiliary downward channel signal 41b is a signal which is transmitted from the second base station 22A to the first mobile station 61A with another forward link. In addition, the first upward channel signal 51 is a signal which is transmitted from the first mobile station 61A to the first and the second base stations 21A and 22A via reverse links.

On the other hand, inasmuch as the received power of the first pilot signal 31 is maximum in the second mobile station 62A, the first base station 21A is the main base station for the second mobile station 62A. Inasmuch as the difference between the received power of the second pilot signal 32 and the received power of the first pilot signal 31 is larger than the handover threshold value in the second mobile station 22A, there is no auxiliary base station in the second mobile station 22A. Under the circumstances, the second mobile station 62A establishes the channel with the first base station 21A and carries out communication with the first base station 21A using the second downward channel signal 42 and the second upward channel signal 52 via the forward link and the reverse link.

Figure 8:
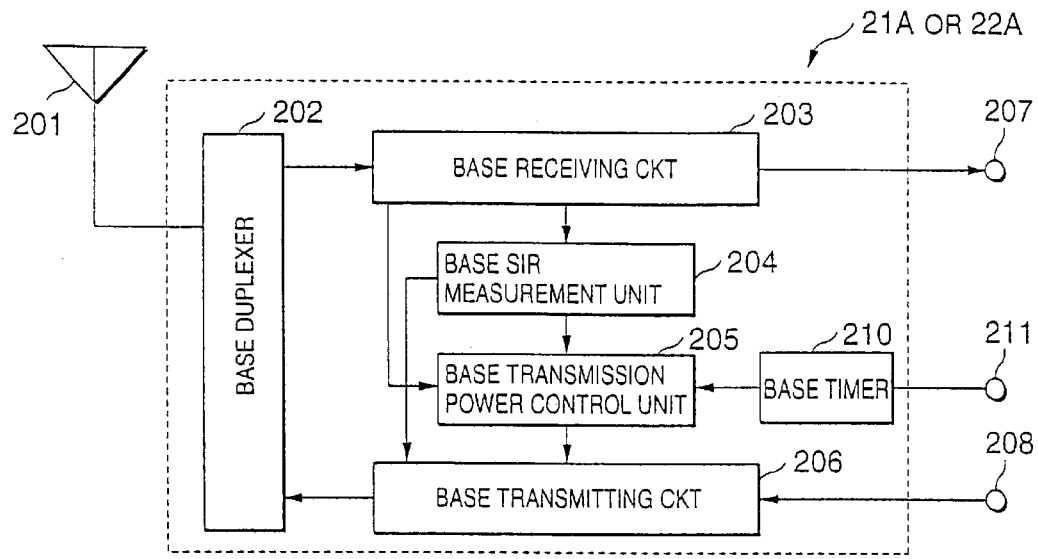
FIG. 8 is a block diagram of a base station for use in the cellular type mobile communication system illustrated in FIG. 7.

Turning to FIG. 8, description will proceed to the base station which is used as each of the first and the second base stations 21A and 22A. The base station comprises a base timer 210 and a base timer terminal 211 as well as the base antenna 201, the base duplexer 202, the base receiving circuit 203, the base signal-to-interference ratio (SIR) measurement unit 204, the base transmission power control unit 205, the base transmitting circuit 206, the base output terminal 207, and the base input terminal 208.

The base antenna 201 is connected to the base duplexer 202 which is connected to the base receiving circuit 203 and the base transmitting circuit 205. The base receiving circuit 203 is connected to the base SIR measurement unit 204, the base transmission power control unit 205, and the base output terminal 207 while the base transmitting circuit 206 is connected to the base transmission power control unit 205 and the base input terminal 208. The base SIR measurement unit 204 is connected to the base transmission power control unit 205 which is connected to the base timer 210. The base timer 210 is connected to the base timer terminal 211.

Whenever the base receiving circuit 203 receives a time slot in the upward channel signal transmitted from the mobile station, the base SIR measurement unit 204 measures a SIR of the time slot in the upward channel signal. The base timer 210 measures an elapsed time.

Figure 9:
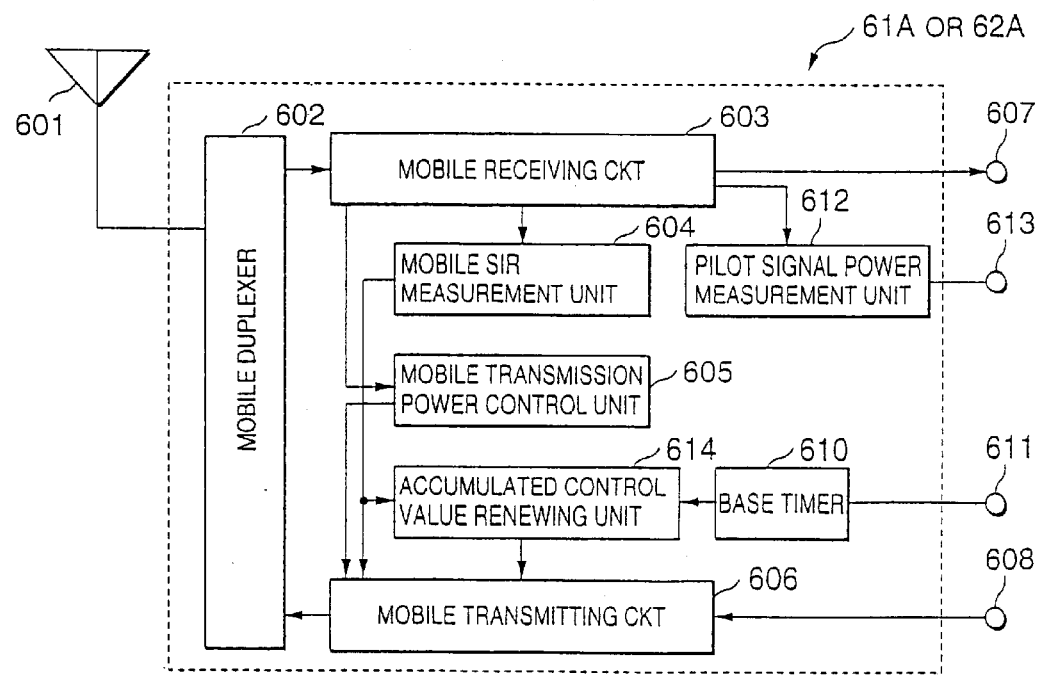
FIG. 9 is a block diagram of a mobile station for use in the cellular type mobile communication system illustrated in FIG. 7.

Turning to FIG. 9, description will proceed to the mobile station which is used as each of the first and the second mobile stations 61A and 62A. The mobile station comprises a mobile timer 610, a mobile timer terminal 611, and an accumulated control value renewing unit 614 as well as the mobile antenna 601, the mobile duplexer 602, the mobile receiving circuit 603, the mobile SIR measurement unit 604, the mobile transmission power control unit 605, the mobile transmitting circuit 606, the mobile output terminal 607, the mobile input terminal 608, the pilot signal power measurement unit 612, and the pilot signal power terminal 613.

The mobile antenna 601 is connected to the mobile duplexer 602 which is connected to the mobile receiving circuit 603 and the mobile transmitting circuit 605. The mobile receiving circuit 603 is connected to the mobile SIR measurement unit 604, the mobile transmission power control unit 605, the mobile output terminal 607, and the pilot signal power measurement unit 612 while the mobile transmitting circuit 606 is connected to the mobile SIR measurement unit 604, the mobile transmission power control unit 605, and the accumulated control value renewing unit 614. The accumulated control value renewing unit 614 is connected to the mobile timer 610 which is connected to the mobile timer terminal 211. The pilot signal power measurement unit 612 is connected to the pilot signal power terminal 613.

Whenever the mobile receiving circuit 603 receives a time slot in the downward channel signal transmitted from the base station, the mobile SIR measurement unit 604 measures a SIR of the time slot in the downward channel signal. The mobile timer 610 measures an elapsed time. The accumulated control value renewing unit 614 renews an accumulated control value in the manner which will later be described.

Figure 10:
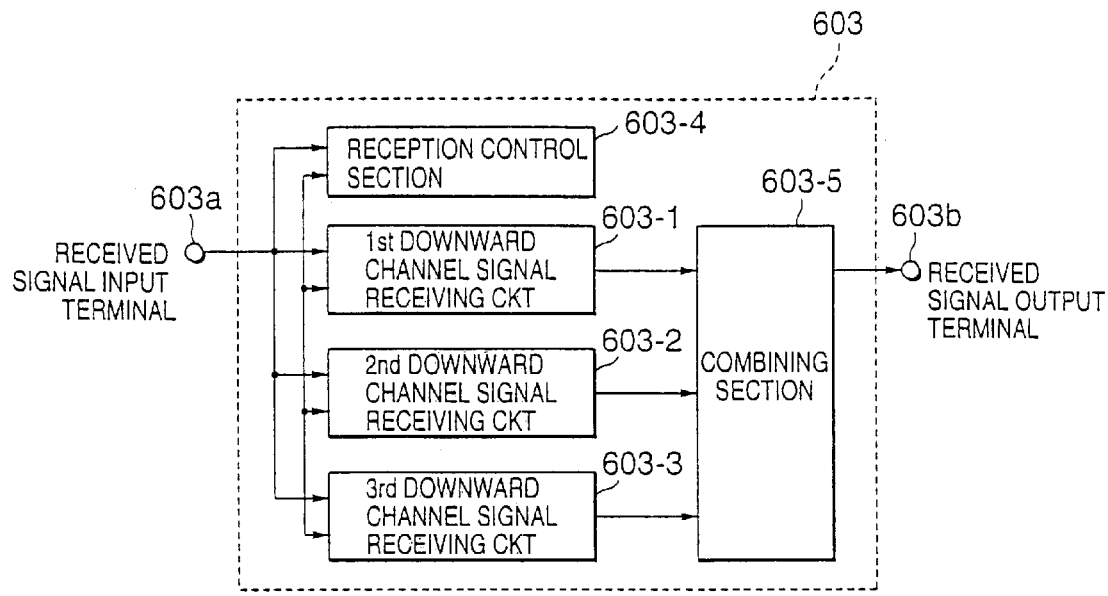
FIG. 10 is a block diagram of a mobile receiving circuit for use in the mobile station illustrated in FIG. 9.

Turning to FIG. 10, the mobile receiving circuit 603 has a received signal input terminal 603a for inputting an input received signal and a received signal output terminal 603b for outputting an output received signal. The mobile receiving circuit 603 comprises first through third downward channel signal receiving circuits 603-1, 603-2, and 603-3, a reception control section 603-4, and a combining section 603-5.

The received signal input terminal 603a is connected to the first through the third downward channel signal receiving circuits 603-1 to 603-3 and the reception control section 603-4. The reception control section 603-4 controls reception operation of the first through the third downward channel signal receiving circuits 603-1 to 603-3. The first through the third downward channel signal receiving circuits 603-1 to 603-3 are connected to the combining section 603-5 which is connected to the received signal output terminal 603b. With this structure, the mobile receiving circuit 603 can receive the same signals transmitted from a plurality of base stations to combine them. That is, the mobile receiving circuit 603 serves as a Rake receiver which is well known in the art.

Figure 11:
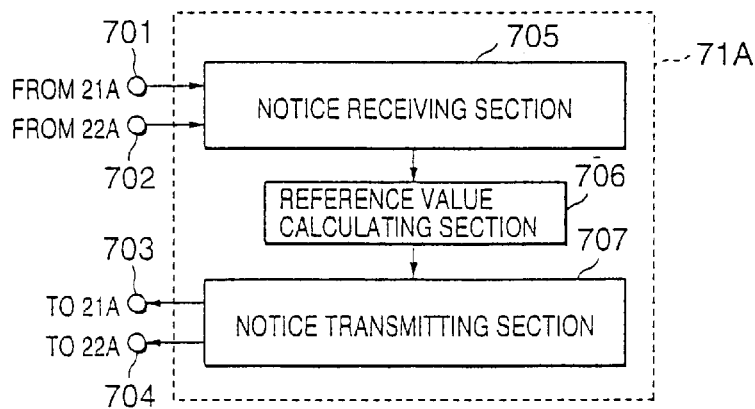
FIG. 11 is a block diagram of a control station for use in the cellular type mobile communication system illustrated in FIG. 7.

Turning to FIG. 11, description will proceed to the control station 71A. The control station 71A has first and second input terminals 701 and 702 connected to the first and the second base stations 21A and 22A, respectively, and first and second output terminals 703 and 704 connected to the first and the second base stations 21A and 22A, respectively. The control station 71A comprises a notice receiving section 705 connected to the first and the second input terminals 701 and 702, a reference value calculating section 706 connected to the notice receiving section 705, and a notice transmitting section 709 connected to the reference value calculating section 706 and the first and the second output terminals 703 and 704.

Turning back to FIG. 7, description will be made about operation of the cellular type mobile communication system illustrated in FIG. 7. As described above, the first and the second base stations 21A and 22A act as the main and the auxiliary base stations, respectively, for the first mobile station 61A which executes the soft handover. The first and the second base stations 21A and 22A transmit, to the first mobile station 61A, the first main downward channel signal 41a and the first auxiliary downward channel signal 41b which have the same information except for the reverse control command for the reverse transmission power.

In the first mobile station 61A, the mobile receiving circuit 603 (FIG. 9) receives the first main downward channel signal 41a and the first auxiliary downward channel signal 41b via the mobile antenna 601 (FIG. 9) and the mobile duplexer 602 (FIG. 9) to combine them. The mobile receiving circuit 603 produces, as the output received signal, a combined received signal which is supplied to the mobile SIR measurement unit 604 (FIG. 9). The mobile measurement unit 604 measures a SIR for the combined received signal to obtain a measured mobile SIR value. In addition, the mobile SIR measurement unit 604 compares the measured mobile SIR value with a target SIR value. When the measured mobile SIR value is smaller than the target SIR value, the mobile SIR measurement unit 604 supplies the mobile transmitting unit 606 (FIG. 9) with the forward control command indicative of increment of the forward transmission power. On the other hand, when the measured mobile SIR value is larger than the target SIR value, the mobile SIR measurement unit 604 supplies the mobile transmitting unit 606 with the forward control command indicative of decrement of the forward transmission power. The mobile transmitting unit 606 of the first mobile station 61A transmits the first upward channel signal 51 including the forward control command to the first and the second base stations 21A and 22A via the mobile duplexer 602 and the mobile antenna 601.

Likewise, the first base station 21A is operable as the main base station for the second mobile station 62A as mentioned before. The first base station 21A transmits the second downward channel signal to the second mobile station 62A.

In the second mobile station 61A, the mobile receiving circuit 603 (FIG. 9) receives the second downward channel signal via the mobile antenna 601 (FIG. 9) and the mobile duplexer 602 (FIG. 9). The mobile receiving circuit 603 produces the output received signal which is supplied to the mobile SIR measurement unit 604 (FIG. 9). The mobile measurement unit 604 measures a SIR for the output received signal to obtain a measured mobile SIR value. In addition, the mobile SIR measurement unit 604 compares the measured mobile SIR value with a target mobile SIR value. When the measured mobile SIR value is smaller than the target mobile SIR value, the mobile SIR measurement unit 604 supplies the mobile transmitting unit 606 (FIG. 9) with the forward control command indicative of increment of the forward transmission power. On the other hand, when the measured mobile SIR value is larger than the target mobile SIR value, the mobile SIR measurement unit 604 supplies the mobile transmitting unit 606 with the forward control command indicative of decrement of the forward transmission power. The mobile transmitting unit 606 of the second mobile station 62A transmits the second upward channel signal 52 including the forward control command to the first base station 21A via the mobile duplexer 602 and the mobile antenna 601.

During execution of the soft handover, each base station controls the forward transmission power using a reference transmission power C which is defined in a plurality of base stations in common. The reference transmission power C is defined in a common way so as to select one of a maximum value, a minimum value, and an intermediate value between the maximum value and the minimum value of the forward transmission power per channel of the base station. Accordingly, if the maximum value and the minimum value of the forward transmission power are different from each other every the base station, the base stations may have the reference transmission powers C which are different from one another. However, in the example being illustrated, it will be assumed that all of the base stations have control ranges for the forward transmission power per channel that are equal to one another and all of the base stations have the reference transmission power C which are equal to one another.

Each of the base stations 21A and 22A carries out the reverse transmission control for the reverse link as follows. That is, each of the base stations 21A and 22A compares a measured base SIR value every slot with a target base SIR value by the base SIR measurement unit 204 (FIG. 8). When the measured base SIR value every slot is smaller than the target base SIR value, the base SIR measurement unit 204 supplies the base transmitting circuit (FIG. 8) with the reverse control command indicative of increment of the reverse transmission power. On the other hand, when the measured base SIR value every slot is larger than the target base SIR value, the base SIR measurement unit 204 supplies the base transmitting circuit with the reverse control command indicative of decrement of the reverse transmission power. The base transmitting circuit 206 of the first base station 21A transmits the first main downward channel signal 41a including the reverse control command to the first mobile station 61A via the base duplexer 202 (FIG. 8) and the base antenna 201 (FIG. 8) while the base transmitting circuit 206 of the first base station 21A transmits the second downward channel signal 42 including the reverse control command to the second mobile station 62A via the base duplexer 202 and the base antenna 201. In addition, the base transmitting circuit 206 of the second base station 22A transmits the first auxiliary downward channel signal 41b including the reverse control command to the first mobile station 61A via the base duplexer 202 and the base antenna 201.

The second mobile station 62A controls the reverse transmission power for the second upward channel signal 52 in response to the reverse control command included in the second downward channel signal 42 transmitted from the first base station 21A with which the second mobile station 62 establishes the channel. On the other hand, the first mobile station 61A receives the first main downward channel signal 41a and the first auxiliary downward channel signal 41b from the first and the second base stations 21A and 22A, respectively. This is because the first mobile station 61A simultaneously establishes the channels with the first and the second base stations 21A and 22A. If the reverse control command included in the first main downward channel signal 41a is different from that included in the first auxiliary downward channel signal 41b, the first mobile station 61A controls the reverse transmission power for the first upward channel signal 51 in response to one of the reverse control commands that indicates that the reverse transmission power for the first upward channel signal 51 becomes smaller.

Figure 12:
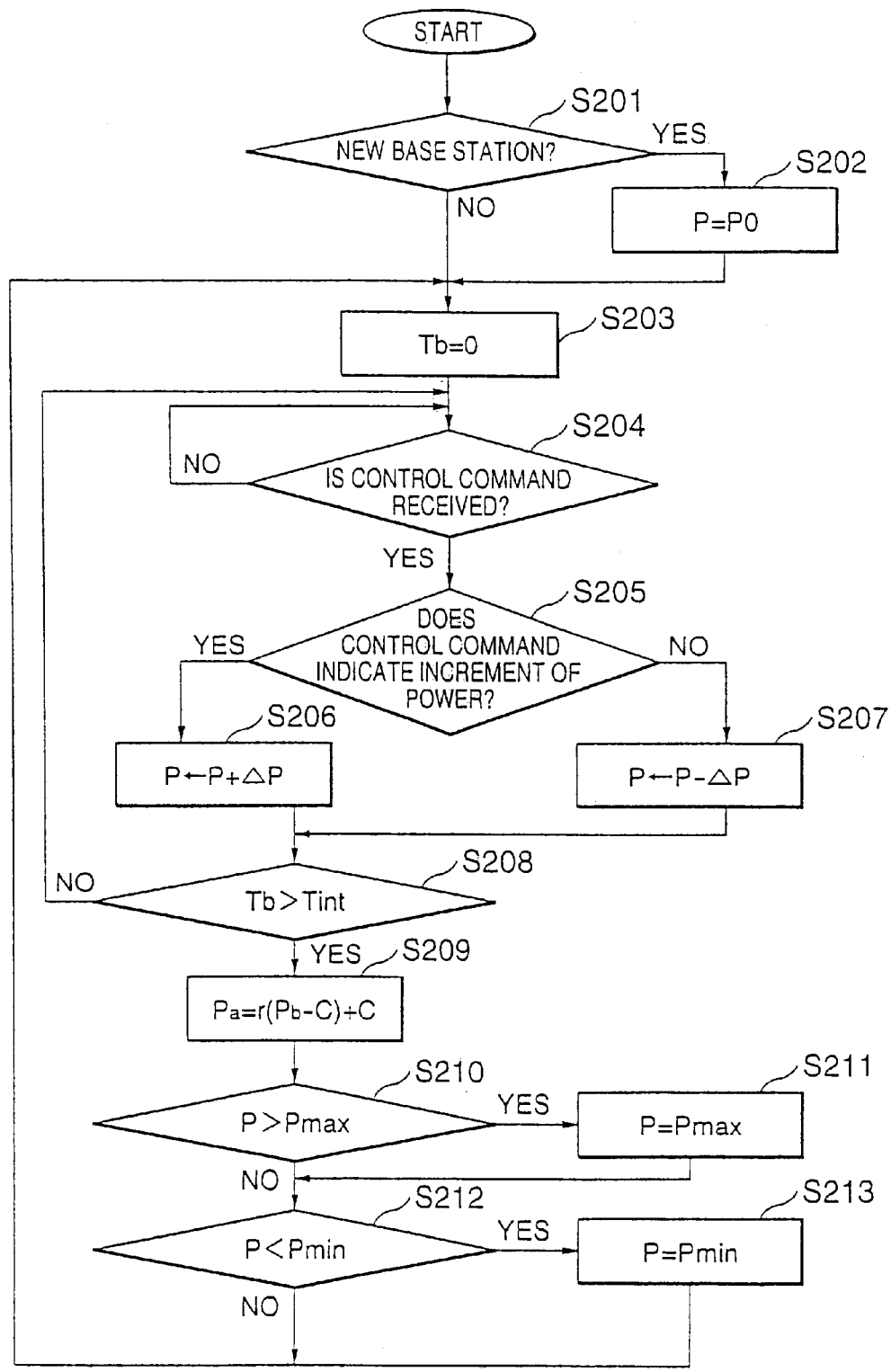
FIG. 12 is a flow chart for use in describing the transmission power control method in the base station according to second through eighth embodiments of the present invention.

Referring to FIG. 12 in addition to FIGS. 7 and 8, description will be made about a transmission power control for the forward link in the cellular type mobile communication system illustrated in FIG. 7. FIG. 12 shows a flow chart for determining the forward transmission power P when the base station receives the forward control command from the mobile station during execution of the soft handover. It will be assumed that the forward transmission power P is represented by decibel (dB).

It will be presumed that the base station is the main base station which carries out transmission with the mobile station for a long time (No in a step S201). In this event, when the base station starts the soft handover with the mobile station, the forward transmission power P for the downward channel signal has a value set immediately before as that of the forward transmission power for the mobile station. It will be assumed that the base station is the auxiliary base station which newly starts transmission for the mobile station (Yes in the step S201). Under the circumstances, when the base station starts the soft handover with the mobile station, the forward transmission power P for the downward channel signal is set to an initial value P0 at a step S201, namely, P=P0.

The step S202 proceeds to a step S203 which follows No in the step S201. At the step S203, a measurement time Tb for the base timer 201 (FIG. 8) is initialized to zero, namely, Tb=0.

The main base station and the auxiliary base station have notice of a frame number for starting the soft handover from the control station 71 and initialize the measurement time Tb to zero on transmission of a frame indicated by the frame number. Therefore, the main base station and the auxiliary base station can simultaneously carry out initialization of the base timer 210 thereof. The initial value P0 may be any value within a control range of the forward transmission power.

The forward control command is sent from the mobile station to the base station at a predetermined time interval. The step S203 is succeeded by a step S204 at which the base transmission power control unit 205 determines whether or not a new forward control command is received. In other words, the base transmission power control unit 205 determines whether or not there is a newly notified forward control command. When there is the newly notified forward control command, the step S204 is followed by a step S205 at which the base transmission power control unit 205 determines whether the newly notified forward control command indicates increment or decrement of the forward transmission power for the forward link. When the newly notified forward control command indicates increment of the forward transmission power for the forward link, the step S205 is succeeded by a step S206 at which the base transmission power control unit 205 makes the base transmitting circuit 206 increase the forward transmission power P for the forward link by a predetermined value ΔP, namely, $$P \leftarrow P + \Delta P.$$

The predetermined value ΔP is called a changing step. On the other hand, when the newly notified forward control command indicates decrement of the forward transmission power for the forward link, the step S205 proceeds to a step S207 at which the base transmission power control unit 205 makes the base transmitting circuit 206 decrease the forward transmission power P for the forward link by the predetermined value ΔP, namely, $P \leftarrow P - \Delta P$.

The steps S206 and S207 are succeeded by a step S208 at which the base transmission power control unit 205 determines whether or not the measurement time Tb of the base timer 210 is longer than a time interval Tint. In other words, the base transmission power control unit 205 determines whether or not the time interval Tint elapses in the base timer 210. When the measurement time Tb is not longer than the time interval Tint, the base transmission power control unit 205 turns from the step S208 to the step S204. When the measurement time Tb is not longer than the time interval Tint, the step S208 proceeds to a step S209 at which the base transmission power control unit 205 renews the forward transmission power P so that a value $r(P_b - C)$ obtained by multiplying a difference between the forward transmission power $P_b$ before renewed and the reference transmission power C by a coefficient r is equal to a difference between the forward transmission power $P_a$ after renewed and the reference transmission power C. That is:

$$P_a = r(P_b - C) + C.$$

The coefficient r is referred to as a common rate. In the example being illustrated, the time interval Tint and the coefficient r have predetermined constant values and the coefficient r is within a value between zero, inclusive, and one, exclusive. In addition, the reference transmission power C is equal to an intermediate transmission power (Pmax+Pmin)/2 between a maximum transmission power Pmax in the forward transmission power and a minimum transmission power Pmin in the forward transmission power, namely, $$C = (P\max + P\min)/2.$$

The step S209 is succeeded by a step S210 at which the base transmission power control unit 205 determines whether or not the forward transmission power P is larger than the maximum transmission power Pmax. When the forward transmission power P is larger than the maximum transmission power Pmax, namely, P>Pmax, the step S210 proceeds to a step S211 at which the base transmission power control unit 205 sets the forward transmission power P to the maximum transmission power Pmax, namely, P=Pmax.

When the forward transmission power P is not larger than the maximum transmission power Pmax, the step S210 is followed by a step S212 which follows the step S211. At the step S212, the base transmission power control unit 205 determines whether or not the forward transmission power P is smaller than a minimum transmission power Pmin. When the forward transmission power P is smaller than a minimum transmission power Pmin, namely, $$P < P\min,$$

the step S212 proceeds to a step S213 at which the base transmission power control unit 205 sets the forward transmission power P to the minimum transmission power Pmin, namely, $$P = P\min.$$

The base transmission power control unit 205 turns from No in the step S212 and the step S213 to the step S203.

At any rate, a combination of the base receiving circuit 203 and the base transmission power control unit 205 serves at the steps S204 to S207 as a first transmission power controller for repeatedly carrying out a first transmission power control operation for receiving the control command for the transmission power from the mobile station 61A while the mobile station establishes the channels with the base stations 21A and 22A and for changing the transmission power P in response to the control command. In addition, the base transmission power control unit 205 acts at the step S209 as a second transmission power controller for repeatedly carrying out a second transmission power control operation which renews the transmission power P so that the transmission powers Pa for the base stations 21A and 22A have less difference and approach the reference power which is defined in the base stations 21A and 22A. In other words, the base transmission power control unit 205 is operable at the step S209 as the second transmission power controller for repeatedly carrying out the second transmission power control operation where each of the base stations 21A and 22A renews the transmission power P so that an absolute value |P−C| of a difference (P−C) between the reference power C in dB defined in the base stations 21A and 22A in common and the transmission power P in dB decreases at the common rate r in the base stations 21A and 22A.

Although one mobile station carries out the soft handover with two base stations in the above-mentioned embodiment, the mobile station may carry out the soft handover with three or more base stations. In this event, whenever the base station carrying out the soft handover with the mobile station increases, processing is repeated from the step S201 to make up the measurement time Tb in the base timers 210 among the base stations.

With the above-mentioned method, inasmuch as the main base station has the initial value of the forward transmission power which is different from that of the auxiliary base station at a time instant where the soft handover is started, there is a different (P1−P2) between a main transmission power P1 of the main base station and an auxiliary transmission poser P2 of the auxiliary base station. In addition, if one or more base stations fail to receive the forward control command, the difference (P1−P2) between the main transmission power P1 and the auxiliary transmission power P2 may increase. However, each of the base stations receives the same forward control command in a part of the steps S204–S207 or a part of increasing or decreasing the forward transmission power in response to the forward control command transmitted from the mobile station, the difference (P1−P2) between the main transmission power P1 and the auxiliary transmission power P2 will not change if each of the base stations does not fail to receive the forward control command. This is because the main transmission power P1 and the auxiliary transmission power P2 are increased or decreased in the similar manner.

On the other hand, inasmuch as the main base station and the auxiliary base station simultaneously renew the main transmission power P1 and the auxiliary transmission power P2 into r(P1−C)+C and r(P2−C)+C, respectively, whenever the time interval Tint elapses as the measurement time Tb of the base timers 210 which are simultaneously initialized, the difference (P1−P2) between the main transmission power P1 and the auxiliary transmission power P2 is changed to r(P1−P2). In the manner which is described above, the difference between the forward transmission powers becomes r times every the time interval Tint. Inasmuch as the coefficient r is less than one, a difference between control amounts decreases in a geometrical series fashion to converge zero if the difference (P1−P2) between the main transmission power P1 and the auxiliary transmission power P2 does not increase due to an occurrence of reception error in a new forward control command. In addition, although the difference (P1−P2) between the main transmission power P1 and the auxiliary transmission power P2 may increase due to the occurrence of the reception error in the new forward control command, it is possible to decrease the difference (P1−P2) of the main transmission power P1 and the auxiliary transmission power P2. Accordingly, although each base channel fails in reception of the forward control command, it is possible to set the forward transmission powers Pi of the forward link to a nearly equal value between the base stations without exchange of information related to the forward transmission power between the base stations, where a suffix i is equal to one or two.

That is, after the forward transmission power is increased or decreased in control of the part of the steps S204–S207, a difference between the forward transmission powers becomes less between the base stations and the forward transmission power is renewed so as to approach the reference transmission power C which is defined by the base stations in common.

In the manner described above, inasmuch as the base stations transmit, to the mobile station, the reverse control commands for the reverse transmission power control of the reverse link at a nearly equal power between the base stations during execution of the soft handover in the mobile station, the mobile station can receive all of the reverse control commands if the propagation losses from the respective base stations to the mobile station are nearly equal to each other and if any base station has the propagation loss of the reverse link which maybe minimum. Accordingly, the mobile station can control the reverse transmission power so that desired wave power is not an excess in any base station.

In addition, inasmuch as the forward transmission power in the base station is controlled independently of the forward control command every the time interval Tint, the forward transmission power may be decreased even if the forward control command indicates the increment of the forward transmission power or the forward transmission power may be increased even if the forward control command indicates the decrement of the forward transmission power. A changing amount of the forward transmission power by renewing the forward transmission powers Pi into r(Pi−C)+C is equal to |(1−r)(C−Pi)| and its maximum value is equal to |(1−r)(C−Pmin)| or |(1−r)(C−Pmax)|. Inasmuch as the reference transmission power C is equal to the average transmission power (Pmax+Pmin)/2 between the maximum transmission power Pmax and the minimum transmission power Pmin in this embodiment, it is possible to reduce the maximum value of the changing amount of the forward transmission power. Accordingly, it is possible to reduce an effect where the reception quality is degraded caused by deficiency of the forward transmission power by controlling every the time interval Tint and to reduce another effect which increases the interference wave power of the forward link due to an excess of the forward transmission power.

Description will proceed to still other embodiments of the present invention.

A transmission power control method for the cellular type mobile communication system according to a third embodiment of the present invention is similar in structure and operation to that according to the second embodiment except for the determination of the reference transmission power C. In the third embodiment, the reference transmission power C is equal to the maximum transmission power Pmax in the forward transmission power.

In the third embodiment, in the similar manner to the second embodiment, although each base station fails in reception of the forward control command, it is possible to set the forward transmission powers Pi of the forward link to a nearly equal value between the base stations without exchange of information related to the forward transmission powers between the base stations.

In the third embodiment, the forward transmission power is increased by (1−r) (Pmax−Pi) every the time interval Tint by renewing the forward transmission powers Pi (i=1,2) into r(Pi−C)+C, respectively. Accordingly, this method according to the third embodiment is advantageous in that it is possible to prevent the reception quality degrading caused by deficiency of the forward transmission power.

A transmission power control method for the cellular type mobile communication system according to a fourth embodiment of the present invention is similar in structure and operation to that according to the second embodiment except for the determination of the reference transmission power C. In the fourth embodiment, the reference transmission power C is equal to the minimum transmission power Pmin in the forward transmission power.

In the fourth embodiment, in the similar manner to the second embodiment, although each base station fails in reception of the forward control command, it is possible to set the forward transmission powers Pi of the forward link to a nearly equal value between the base stations without exchange of information related to the forward transmission powers between the base stations. In the fourth embodiment, the forward transmission power is decreased by (1-r)(Pi-Pmin) every time interval Tint by renewing the forward transmission powers Pi (i=1,2) into r(Pi C)+C, respectively. Accordingly, this method according to the fourth embodiment is advantageous in that it is possible to prevent the interference wave power of the forward link increasing caused by an excess of the forward transmission power.

Description will proceed to yet other embodiments of the present invention.

A transmission power control method for the cellular type mobile communication system according to a fifth embodiment of the present invention is similar in structure and operation to that according to the second embodiment except for the determination of the reference transmission power C.

In the fifth embodiment, each of the main base station and the auxiliary base station for the mobile station executing the soft handover simultaneously calculates an average value of the forward transmission power for the mobile station and send the average value as a statistical value of the forward transmission power to the control station 71A. The control station 71A determines, as a reference value indicating the reference transmission power C, one of the statistical values of the forward transmission powers that is sent from the main base station and sends the reference transmission power C to each of the base stations. In addition, each of the base stations uses the reference transmission power C having the reference value sent from the control station 71A on renewing the forward transmission power for the mobile station in question.

According to the transmission power control method of the fifth embodiment, in the similar manner to the second embodiment, although each base station fails in reception of the forward control command, it is possible to set the forward transmission powers Pi of the forward link to a nearly equal value between the base stations. In addition, inasmuch as the reference transmission power C within which the forward transmission power actually changes is set in each base station, a difference between an actual forward transmission power and the reference transmission power C is reduced. Accordingly, variation of the forward transmission power due to renewing of the forward transmission power every the time interval Tint is small and it is possible to restrain an effect where the forward transmission power is insufficient or excessive to the minimum. In addition, the control station 71A determines, as the reference value indicating the reference transmission power C, the statistical value sent from the main base station. Inasmuch as the main base station has a minimum average value of the propagation loss for the mobile station, the reference transmission power has highest reliability. Accordingly, it is possible to reduce the variation of the forward transmission power due to renewing of the forward transmission power every the time interval Tint all the more.

As described above, the statistical value of the forward transmission power and the reference transmission power are exchanged between the base station and the control station 71A. Inasmuch as this exchange is carried out at a time period longer than a control period for the transmission power control, a transmission amount of control information between the base station and the control station 71A is almost no problem. In addition, although there is delayed time, it is possible to set the forward transmission powers to be equal to each other without a difficulty if the delayed time is the same between the base stations. Accordingly, it is possible to set the forward transmission powers to be equal to each other with a little transmission amount of control signals between the base station and the control station and with the effect where the forward transmission power is insufficient or excessive caused by a large variation of the forward transmission power restrained.

A transmission power control method for the cellular type mobile communication system according to a sixth embodiment of the present invention is similar in structure and operation to that according to the fifth embodiment except for a method of determining the reference transmission power C in the control station 71A.

In the sixth embodiment, the control station 71A determines, as the reference value indicating the reference transmission power C, a maximum one of the statistical values of the forward transmission powers that are sent from the base stations and send the reference value to each of the base stations.

In the sixth embodiment, inasmuch as the control station 71A determines the reference value indicating the reference transmission power C using the statistical value of the base station having a larger forward transmission power in a case where there is a difference between the forward transmission powers of the base stations caused by reception error of the forward control command and the statistical values of the forward transmission powers sent from the base stations to the control station 71A are different from each other, the reference transmission power C is not determined in any base station to be smaller for a value within a range where the forward transmission power actually varies. Accordingly, it is possible to reduce a probability of degradation of the reception quality by reducing a probability that the forward transmission power is insufficient on renewing of the forward transmission power every the time interval Tint.

A transmission power control method for the cellular type mobile communication system according to a seventh embodiment of the present invention is similar in structure and operation to that according to the fifth embodiment except that the base stations set the coefficients or the common rates in accordance with information transmitted from the mobile station individually instead of using the constant coefficient or the constant rate r.

In the seventh embodiment, there is first and second coefficients (rates) r1 and r2 as candidates of the coefficient (common rate) r, where each of the first and the second coefficients (rates) r1 and r2 is not less than zero and is less than one and the second coefficient (rate) r2 is smaller than the first coefficient (rate) r1. When a difference between a maximum value and a minimum value in the statistical values of the forward transmission powers sent from the base stations is smaller than a predetermined reference value, the control station 71A (the reference value calculating section 706) sets the first coefficient (rate) r1 as the coefficient (common rate) r and sends the first coefficient (rate) r1 to the base stations. When the difference between the maximum value and the minimum value in the statistical values of the forward transmission powers sent from the base stations is larger than the predetermined reference value, the control station 71A (the reference value calculating section 706) sets the second coefficient (rate) r2 as the coefficient (common rate) r and sends the second coefficient (rate) r2 to the base stations. In addition, each of the base stations uses the sent coefficient (rate) as the common rate r.

At any rate, the reference value calculating section 706 of the control station 71A determines the common rate r in accordance with mutual difference among the statistical values of the base stations.

According to the transmission power control method of the seventh embodiment, the difference between the forward transmission powers becomes r times every the time interval Tint. It will be assumed that the reception error of the forward control command sent from the mobile station to the base station has a high probability and a mutual difference between the forward transmission powers of the base stations is large. In this event, inasmuch as the coefficient (common rate) r is set to a smaller value, it is possible to reduce the difference between the forward transmission powers at a short time interval. On the other hand, it will be presumed that the reception error of the forward control command has a low probability and a mutual difference between the forward transmission powers of the base stations is small. In this event, inasmuch as the coefficient (common rate) r is set to a larger value, it is possible to reduce variation of the forward transmission power every the time interval Tint and to reduce a degree where the forward transmission power is insufficient or excessive.

A transmission power control method for the cellular type mobile communication system according to an eighth embodiment of the present invention is similar in structure and operation to that according to the fifth embodiment except that the base stations set the time intervals in accordance with the mobile station individually instead of using the constant time interval Tint.

In the eighth embodiment, there is first and second time intervals Tint1 and Tint2 as candidates of the time interval Tint, where the second time interval Tint2 is shorter than the first time interval Tint1. When a difference between a maximum value and a minimum value in the statistical values of the forward transmission powers sent from the base stations is smaller than a predetermined reference value, the control station 71A (the reference value calculating section 706) sets the first time interval Tint1 as the time interval Tint and sends the first time interval Tint1 to the base stations. When the difference between the maximum value and the minimum value in the statistical values of the forward transmission powers sent from the base stations is larger than the predetermined reference value, the control station 71A (the reference value calculating section 706) sets the second time interval Tint2 as the time interval Tint and sends the second time interval Tint2 to the base stations. In addition, each of the base stations uses the sent time interval Tint.

At any rate, the reference value calculating section 706 of the control section 71A determines frequency for renewing the transmission power P by the common rate r in accordance with mutual differences among the statistical values of the base stations.

According to the transmission power control method of the eighth embodiment, the difference between the forward transmission powers becomes r times every the time interval Tint. It will be assumed that the reception error of the forward control command sent from the mobile station to the base station has a high probability and a mutual difference between the forward transmission powers of the base stations is large. In this event, inasmuch as the time interval Tint is set to a shorter one, it is possible to rapidly reduce the difference between the forward transmission powers. On the other hand, it will be presumed that the reception error of the forward control command has a low probability and the mutual difference between the forward transmission powers of the base stations is small. In this event, inasmuch as the time interval Tint is set to a longer one, it is possible to reduce frequency of renewal of the forward transmission power every the time interval Tint and to reduce frequency where the forward transmission power is insufficient or excessive caused by variation due to the renewal.

A transmission power control method for the cellular type mobile communication system according to a ninth embodiment of the present invention is carried out in the cellular type mobile communication system illustrated in FIG. 7. In the similar procedure described in the second embodiment, each of the first and the second mobile stations 61A and 62A measures the received powers of the first and the second pilot signals 31 and 32 and establishes the channels with the main base station and the auxiliary base station on carrying out communication. In addition, in the similar manner described in the second embodiment, each of the first and the second base stations 21A and 22A measures, on reception of the time slot which the mobile station transmits, the SIR off the time slot while each of the first and the second 61A and 62A measures, on reception of the time slot which base station transmits, the SIR of the time slot. Furthermore, in the similar manner described in the second embodiment, the first and the second base stations 21A and 22A, which are the main and the auxiliary base stations for the first mobile station 61 executing the soft handover, transmit, to the first mobile station 61A, the first main downward channel signal 41a and the first auxiliary downward channel signal which include the same information except for the reverse control command for the reverse transmission power.

In the similar manner described in the second embodiment, the first mobile station 61 receives the first main downward channel signal 41a and the first auxiliary downward channel signal 41b to combine them, measures the SIR of the combined downward channel signal, and compares the measured mobile SIR value with the target mobile SIR value. When the measured mobile SIR value is smaller than the target mobile SIR value, the forward control command indicates increment of the forward transmission power. When the measured mobile SIR value if larger than the target mobile SIR value, the forward control command indicates decrement of the forward transmission power. The first mobile station 61A transmits the forward control command to the first and the second base stations 21A and 22A. Likewise, the second mobile station 62A transmits the forward control command to the first base station 21A. In addition, a method of controlling the reverse transmission power of the reverse link is similar to the second embodiment.

As shown in FIG. 9, the first mobile station 61A includes the mobile timer 601 for measuring an elapsed time.

Although description will be made using flow charts, the power is represented by decibel (dB) in the flow charts and those descriptions.

Figure 13:
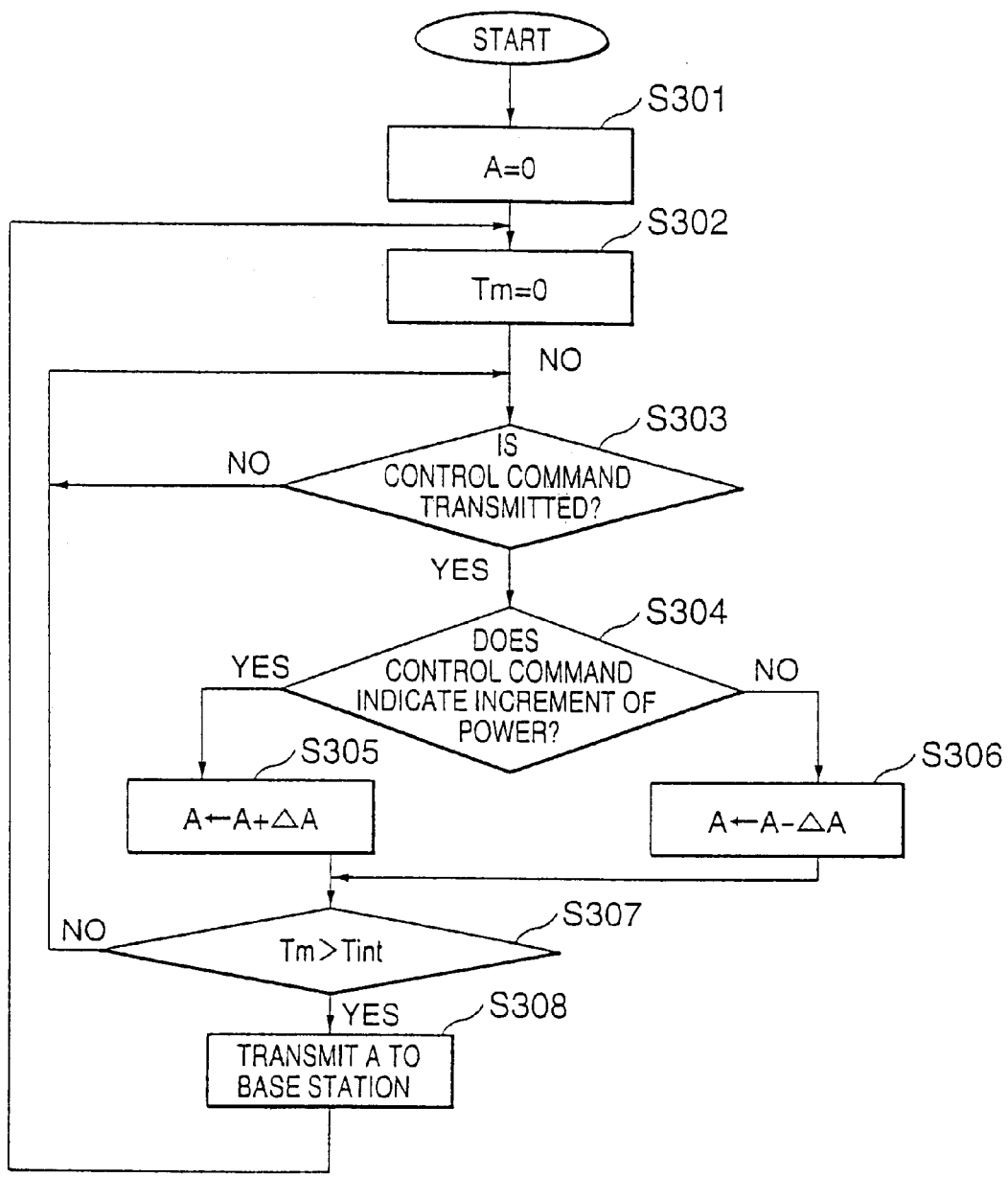
FIG. 13 is a flow chart for use in describing the transmission power control method in the mobile station according to a ninth embodiment of the present invention.

FIG. 13 is a flow chart for use in describing operation where the mobile station calculates an accumulated control value A to send it to the base station during execution of the soft handover. When the soft handover is started, the mobile station initializes the accumulated control value A into zero at a step S301, namely, $A=0.$ The step S301 proceeds to a step S302 at which a measurement time Tm for the mobile timer 610 (FIG. 9) is initialized to zero, namely, Tm=0.

When the mobile station transmits the forward control command to the base station (Yes in a step S303), the step S303 is succeeded by a step S304 at which the mobile station determines whether the forward control command indicates the increment or the decrement of the forward transmission power. When the forward control command indicates the increment of the forward transmission power, the step S304 is followed by a step S305 at which the mobile station increments the accumulated control value A by a predetermined value ΔA, namely, $$A \leftarrow A + \Delta A$$

On the other hand, when the forward control command indicates the decrement of the forward transmission power, the step S304 proceeds to a step S306 at which the mobile station decrements the accumulated control value A by the predetermined value ΔA, namely, $$A \leftarrow A - \Delta A$$

The steps S305 and S306 are succeeded by a step S307 at which the mobile station determines whether or not the measurement time Tm of the mobile timer 610 is longer than a time interval Tint. In other words, the mobile station determines whether or not the time interval Tint elapses in the mobile timer 610. When the measurement time Tm is not longer than the time interval Tint, the mobile station turns from the step S307 to the step S303. When the measurement time Tm is not longer than the time interval Tint, the step S307 proceeds to a step S308 at which the mobile station transmits the accumulated control value A to each of the base stations. The mobile station turns from the step S308 to the step S302.

Figure 14:
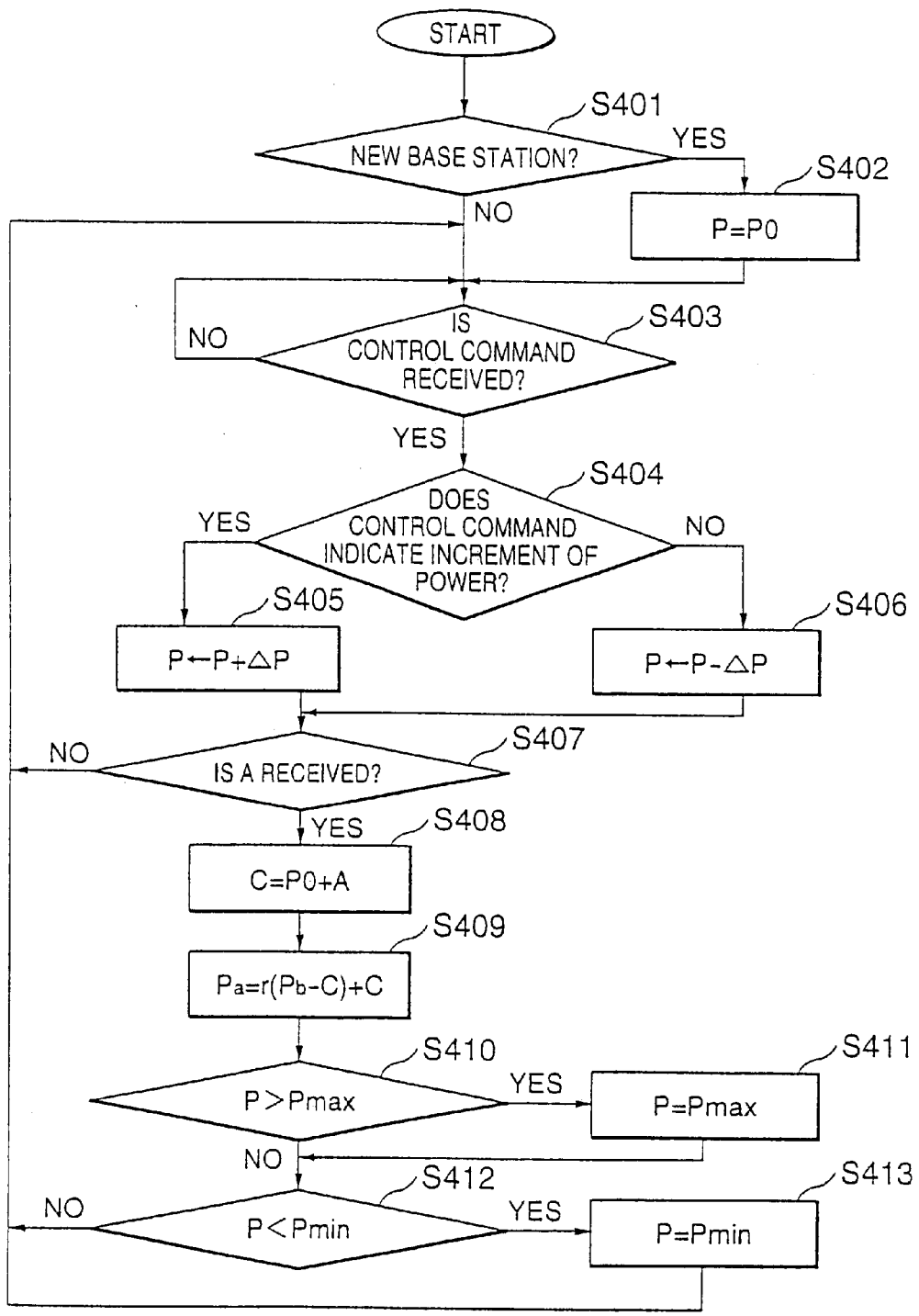
FIG. 14 is a flow chart for use in describing the transmission power control method in the base station according to the ninth embodiment of the present invention.

FIG. 14 is a flow chart for use in describing operation where the base station receives the forward control command from the mobile station, determines the forward transmission power of the forward link, and carries out transmission of the downward channel signal.

It will be presumed that the base station is the main base station which carries out transmission with the mobile station for a long time (No in a step S401). In this event, when the base station starts the soft handover with the mobile station, the forward transmission power p for the downward channel signal has a value set immediately before as that of the forward transmission power for the mobile station. It will be assumed that the base station is the auxiliary base station which newly starts transmission for the mobile station (Yes in the step S401). Under the circumstances, when the base station starts the soft handover with the mobile station, the forward transmission power P for the downward channel signal is set to an initial value P0 at a step S402, namely, $$P = P0.$$

Although the initial value P0 may be any value within a control range for the forward transmission power, the initial value P0 is equal to a maximum transmission power Pmax in the forward transmission power in the example being illustrated.

The forward control command is sent from the mobile station to the base station at a predetermined time interval. The step S402 proceeds to a step S403 which follows No in the step S401. At the step S403, the base transmission power control unit 205 (FIG. 8) determines whether or not a new forward control command is received in the base receiving circuit 203 (FIG. 8). In other words, the base transmission power control unit 205 determines whether or not there is a newly notified forward control command. When there is the newly notified forward control command, the step S403 is followed by a step S403 at which the base transmission power control unit 205 determines whether the newly notified forward control command indicates increment or decrement of the forward transmission power for the forward link. When the newly notified forward control command indicates increment of the forward transmission power for the forward link, the step S404 is succeeded by a step S405 at which the base transmission power control unit 205 makes the base transmitting circuit 206 increase the forward transmission power P for the forward link by a predetermined value ΔP, namely, $$P \leftarrow P + \Delta P$$

The predetermined value ΔP is called a changing step. On the other hand, when the newly notified forward control command indicates decrement of the forward transmission power for the forward link, the step S404 proceeds to a step S406 at which the base transmission power control unit 205 makes the base transmitting circuit 206 decrease the forward transmission power P for the forward link by the predetermined value ΔP, namely, $$P \leftarrow P - \Delta P$$

The predetermined value ΔP used in the base station is set to be equal to the predetermined value ΔA used in the mobile station, namely, $$\Delta P = \Delta A$$

The steps S405 and S406 are succeeded by a step S407 at which the base transmission power control unit 205 determines whether or not the base receiving circuit 203 receives the accumulated control value A from the mobile station. When the base receiving circuit 203 does not receive the accumulated control value A, the base transmission power control unit 205 turns from the step S407 to the step S403. When the base receiving circuit 203 receives the accumulated control value A, the step S407 is followed by a step S408 at which the base transmission power control unit 205 calculates a reference transmission power C as the sum of the initial value P0 and the accumulated control value A, namely, $$C = P0 + A.$$

The step S408 proceeds to a step S409 at which the base transmission power control unit 205 renews the forward transmission power P so that a value $r(P_b - C)$ obtained by multiplying a difference between the forward transmission power $P_b$ before renewed and the reference transmission power C by a coefficient r is equal to a difference between the forward transmission power $P_a$ after renewed and the reference transmission power C. That is:

$$P_a = r(P_b - C) + C.$$

The coefficient r is referred to as a common rate. In the example being illustrated, the time interval Tint and the coefficient r have predetermined constant values and the coefficient r is within a value between zero, inclusive, and one, exclusive.

The step S409 is succeeded by a step S410 at which the base transmission power control unit 205 determines whether or not the forward transmission power P is larger than the maximum transmission power Pmax. When the forward transmission power P is larger than the maximum transmission power Pmax, namely, $P > P\max,$ the step S410 proceeds to a step S411 at which the base transmission power control unit 205 sets the forward transmission power P to the maximum transmission power Pmax, namely, $P = P\max.$ When the forward transmission power P is not larger than the maximum transmission power Pmax, the step S410 is followed by a step S412 which follows the step S411. At the step S412, the base transmission power control unit 205 determines whether or not the forward transmission power P is smaller than a minimum transmission power Pmin, namely, $P < P\min,$ the step S412 proceeds to a step S413 at which the base transmission power control unit 205 sets the forward transmission power P to the minimum transmission power Pmin, namely, $P = P\min.$ The base transmission power control unit 205 turns from No in the step S412 and the step S413 to the step S403.

At any rate, a combination of the base receiving circuit 203 and the base transmission power control unit 205 serves at the steps S403 to S406 as a first transmission power controller for repeatedly carrying out a first transmission power control operation for receiving the control command for the transmission power from the mobile station 61A while the mobile station establishes the channels with the base stations 21A and 22A and for changing the transmission power P in response to the control command. In addition, the base transmission power control unit 205 acts at the step S409 as a second transmission power controller for repeatedly carrying out a second transmission power control operation which renews the transmission power P so that the transmission powers $P_a$ for the base stations 21A and 22A have less difference and approach the reference power which is defined in the base stations 21A and 22A. In other words, the base transmission power control unit 205 is operable at the step S409 as the second transmission power controller for repeatedly carrying out the second transmission power control operation where each of the base stations 21A and 22A renews the transmission power P so that an absolute value |P−C| of a difference (P−C) between the reference power C in dB defined in the base stations 21A and 22A in common and the transmission power P in dB decreases at the common rate r in the base stations 21A and 22A.

With this method, there is a difference (P1−P2) between a main transmission power P1 of the main base station and an auxiliary transmission power P2 of the auxiliary base station at a time instant where the soft handover is started. However, if there is no reception error in the forward control command, the difference (P1−P2) between the main transmission power P1 and the auxiliary transmission power P2 becomes r times and the difference (P1−P2) converges zero. Accordingly, it is possible to set the forward transmission powers for the base stations to values which are equal to each other.

In addition, in this method, renewal for making the forward transmission power P approach the reference transmission power C is repeatedly carried out. Inasmuch as the reference transmission power C, which is calculated as the sum of the initial value P0 and the accumulated control value A, increases or decreases in the similar manner as the forward transmission power P at a slot unit, the reference transmission power C and the forward transmission power P are nearly equal to each other at a time when the accumulated control value A is sent. Accordingly, the forward transmission power P changes hardly by renewing the forward transmission power P in the channel where the reception error does not occur. In addition, the forward transmission power P approaches the reference transmission power C in the channel where the forward transmission power P is different from the reference transmission power C due to occurrence of the reception error in the forward control command. As a result, when the auxiliary base station having a relatively bad channel quality has the forward transmission power which is different from that of the main base station, only the forward transmission power of the auxiliary base station is corrected without almost affecting the transmission power control for the main base station which may have a relatively good channel quality. In the manner as described above, it is possible to reduce effect where the forward transmission power is insufficient or excessive on equalizing the forward transmission powers among the base stations.

In addition, the method illustrated in FIGS. 13 and 14 is carried out in the similar manner in a case where the mobile station establishes the channel with only one base station during no execution of the soft handover. In this case, when the soft handover is started or when the new auxiliary base station is added, it is possible to carry out the method without a difficulty although the control is continued in the entirely similar manner with reference to the flow chart illustrated in FIG. 13 without initialization of the accumulated control value A.

A transmission power control method for the cellular type mobile communication system according to a tenth embodiment of the present invention is carried out in the cellular type mobile communication system illustrated in FIG. 7. In the similar procedure described in the second embodiment, each of the first and the second mobile stations 61A and 62A measures the received powers of the first and the second pilot signals 31 and 32 and establishes the channels with the main base station and the auxiliary base station on carrying out communication. In addition, in the similar manner described in the second embodiment, each of the first and the secondbase stations 21A and 22A measures, on reception of the time slot which the mobile station transmits, the SIR of the time slot while each of the first and the second 61A and 62A measures, on reception of the time slot which base station transmits, the SIR of the time slot. Furthermore, in the similar manner described in the second embodiment, the first and the second base stations 21A and 22A, which are the main and the auxiliary base stations for the first mobile station 61 executing the soft handover, transmit, to the first mobile station 61A, the first main downward channel signal 41*a* and the first auxiliary downward channel signal which include the same information except for the reverse control command for the reverse transmission power.

In the similar manner described in the second embodiment the first mobile station 61 receives the first main downward channel signal 41*a* and the first auxiliary downward channel signal 41*b* to combine them, measures the SIR of the combined downward channel signal, and compares the measured mobile SIR value with the target mobile SIR value. When the measured mobile SIR value is smaller than the target mobile SIR value, the forward control command indicates increment of the forward transmission power. When the measured mobile SIR value if larger than the target mobile SIR value, the forward control command indicates decrement of the forward transmission power. The first mobile station 61A transmits the forward control command to the first and the second base stations 21A and 22A. Likewise, the second mobile station 62A transmits the forward control command to the first base station 21A. In addition, a method of controlling the reverse transmission power of the reverse link is similar to the second embodiment.

Although description will be made using a flow chart, the power is represented by decibel (dB) in the flow chart and its description.

Figure 15:
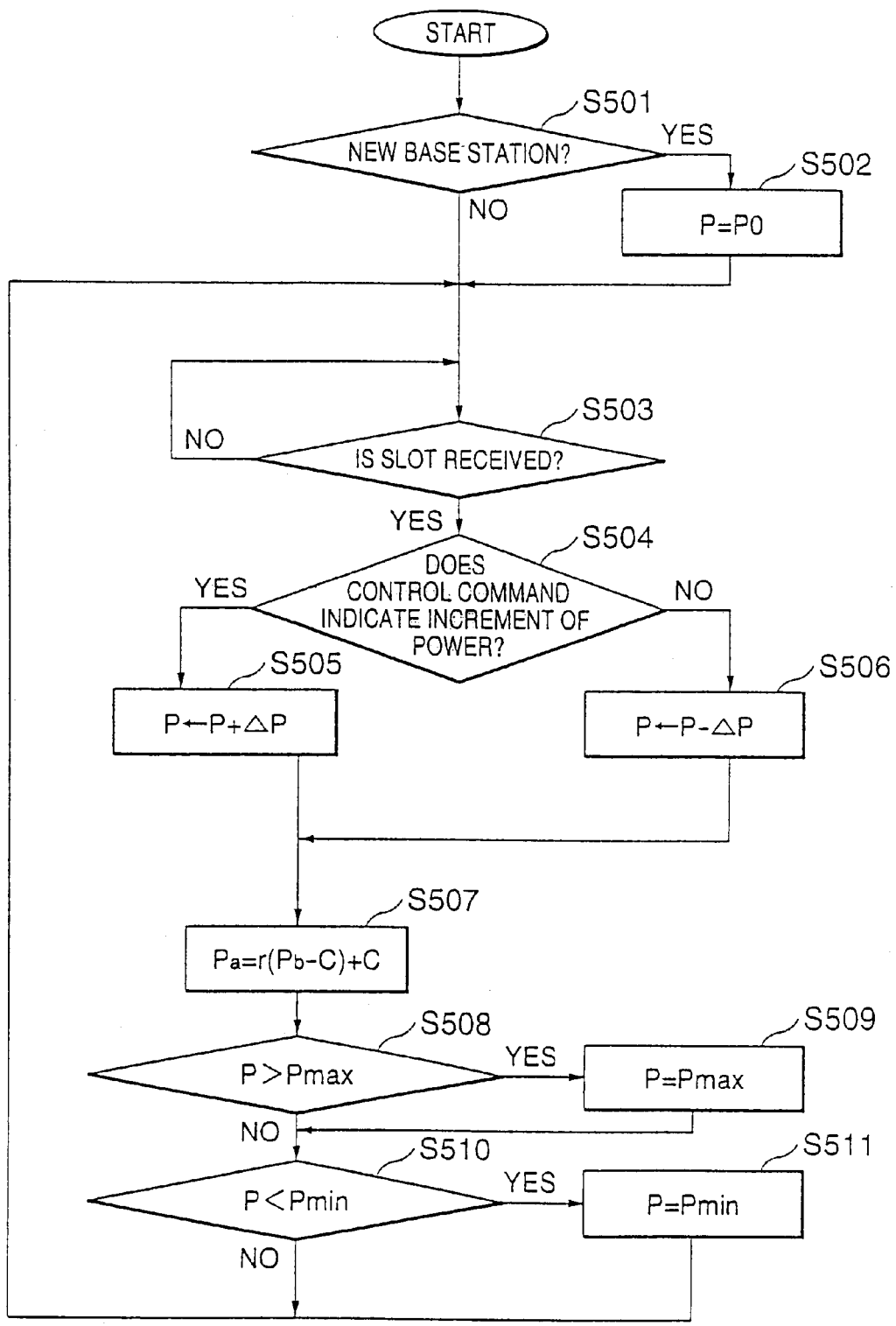
FIG. 15 is a flow chart for use in describing the transmission power control method in the base station according to a tenth embodiment of the present invention.

FIG. 15 is a flow chart for use in describing operation where the base station receives the forward control command from the mobile station and determines the forward transmission power of the forward link during execution of the soft handover.

It will be presumed that the base station is the main base station which carries out transmission with the mobile station for a long time (No in a step S401). In this event, when the base station starts the soft handover with the mobile station, the forward transmission power P for the downward channel signal has a value set immediately before as that of the forward transmission power for the mobile station. It will be assumed that base station is the auxiliary base station which newly starts transmission for the mobile station (Yes in the step S501). Under the circumstances, when the base station starts the soft handover with the mobile station, the forward transmission power P for the downward channel signal is set to an initial value P0 at a step S402, namely, $$P=P0.$$

The initial value P0 may be any value within a control range for the forward transmission power. The mobile station transmits, to the base station, the upward channel signal comprising time slots each of which includes the forward control command. The step S502 proceeds to a step S503 which follows No in the step S501. At the step S503, the base transmission power control unit 205 (FIG. 8) determines whether or not the base receiving circuit 203 (FIG. 8) receives a time slot of the upward channel signal from the mobile station. When the base receiving circuit 203 receives the time slot of the upward channel signal, the step S503 is followed by a step S504 at which the base transmission power control unit 205 determines whether the forward control command in the time slot indicates increment or decrement of the forward transmission power for the forward link. When the forward control command in the time slot indicates increment of the forward transmission power for the forward link, the step S504 is succeeded by a step S505 at which the base transmission power control unit 205 makes the base transmitting circuit 206 increase the forward transmission power P for the forward link by a predetermined value ΔP, namely, $$P \leftarrow P + \Delta P$$

The predetermined value ΔP is called a changing step. On the other hand, when the forward control command in the time slot indicates decrement of the forward transmission power for the forward link, the step S504 proceeds to a step S506 at which the base transmission power control unit 205 makes the base transmitting circuit 206 decrease the forward transmission power P for the forward link by the predetermined value ΔP, namely, $$P \leftarrow P - \Delta P$$

The steps 505 and 506 are followed by a step S507 at which the base transmission power control unit 205 renews the forward transmission power P so that a value $r(P_b-C)$ obtained by multiplying a difference between the forward transmission power $P_b$ before renewed and a predetermined reference transmission power C by a coefficient r is equal to a difference between the forward transmission power $P_a$ after renewed and the predetermined reference transmission power C. That is:

$$P_a = r(P_b - C) + C.$$

The coefficient r is referred to as a common rate. The step S507 is succeeded by a step S408 at which the base transmission power control unit 205 determines whether or not the forward transmission power P is larger than a maximum transmission power Pmax. When the forward transmission power P is larger than the maximum transmission power Pmax, namely, $$P > P\max,$$

the step S508 proceeds to a step S509 at which the base transmission power control unit 205 sets the forward transmission power P to the maximum transmission power Pmax, namely, $$P = P\max.$$

When the forward transmission power P is not larger than the maximum transmission power Pmax, the step S508 is followed by a step S510 which follows the step S509. At the step S510, the base transmission power control unit 205 determines whether or not the forward transmission power P is smaller than a minimum transmission power Pmin When the forward transmission power P is smaller than a minimum transmission power Pmin, namely, $$P < P\min,$$

the step S510 proceeds to a step S511 at which the base transmission power control unit 205 sets the forward transmission power P to the minimum transmission power Pmin, namely, $$P = P\min.$$

The base transmission power control unit 205 turns from No in the step S510 and the step S511 to the step S503.

At any rate, a combination of the base receiving circuit 203 and the base transmission power control unit 205 serves at the steps S503 to S506 as a first transmission power controller for repeatedly carrying out a first transmission power control operation for receiving the control command for the transmission power from the mobile station 61A while the mobile station establishes the channels with the base stations 21A and 22A and for changing the transmission power P in response to the control command. In addition, the base transmission power control unit 205 acts at the step S507 as a second transmission power controller for repeatedly carrying out a second transmission power control operation which renews the transmission power P so that the transmission powers $P_a$ for the base stations 21A and 22A have less difference and approach the reference power which is defined in the base stations 21A and 22A. In other words, the base transmission power control unit 205 is operable at the step S507 as the second transmission power controller for repeatedly carrying out the second transmission power control operation where each of the base stations 21A and 22A renews the transmission power P so that an absolute value |P−C| of a difference (P−C) between the reference power C in d3 defined in the base stations 21A and 22A in common and the transmission power P in dB decreases at the common rate r in the base stations 21A and 22A.

In the example being illustrated, the predetermined reference transmission power C is equal to the maximum transmission power Pmax, namely, $C=P\text{max}.$ The coefficient r is set within a range between zero, inclusive, and one, exclusive. Specifically, the coefficient r is set so that a changing amount {r(P−C)+C}−P, namely, (1−r)(C−P) of the forward transmission power P in the step S507 is smaller than the predetermined value ΔP of the forward transmission power P in the steps S505 and S506. This is because it is necessary to increase or decrease the forward transmission power P in accordance with the forward control command from the mobile station. That is, the coefficient r has a setting range as follows:

$1-\Delta P/(C-P) < r < 1$

Inasmuch as the predetermined reference transmission power C is equal to the maximum transmission power Pmax in the example being illustrated, the setting range of the coefficient r becomes as follows:

$1-\Delta P/(P\text{max}-P) < r < 1.$

It will be assumed that a difference between the maximum transmission power Pmax and the minimum transmission power Pmin is equal to 10 dB and the predetermined value ΔP is equal to 1 dB. Under the circumstances, the setting range of the coefficient r becomes as follows:

$0.9 < r < 1.$

Desirably, the coefficient r may be set to about 0.95. This is because the step S507 does not have effect if the coefficient r is nearly equal to one.

With the above-mentioned method, in the similar manner as described in the second embodiment, inasmuch as the main base station has the initial value of the forward transmission power which is different from that of the auxiliary base station at a time instant where the soft handover is started, there is a different (P1−P2) between a main transmission power P1 of the main base station and an auxiliary transmission poser P2 of the auxiliary base station. In addition, if one or more base stations fail to receive the forward control command, the difference (P1−P2) between the main transmission power P1 and the auxiliary transmission power P2 may increase. However, each of the base stations receives the same forward control command in a part of the steps S504–S506 or a part of increasing or decreasing the forward transmission power in response to the forward control command transmitted from the mobile station, the difference (P1−P2) between the main transmission power P1 and the auxiliary transmission power P2 will do not change if each of the base stations does not fail to receive the forward control command. This is because the main transmission power P1 and the auxiliary transmission power P2 are increased or decreased in the similar manner.

On the other hand, inasmuch as the main base station and the auxiliary base station simultaneously renew the main transmission power P1 and the auxiliary transmission power P2 into r(P1−C)+C and r(P2−C)+C in the step S507, respectively, the difference (P1−P2) between the main transmission power P1 and the auxiliary transmission power P2 is changed to r(P1−P2). In the manner which is described above, the difference between the forward transmission powers becomes r times every the time slot. Inasmuch as the coefficient r is less than one, a difference between control amounts decreases in a geometrical series fashion to converge zero if the difference (P1−P2) between the main transmission power P1 and the auxiliary transmission power P2 does not increase due to an occurrence of reception error in a new forward control command. In addition, although the difference (P1−P2) between the main transmission power P1 and the auxiliary transmission power P2 may increase due to the occurrence of the reception error in the new forward control command, it is possible to decrease the difference (P1−P2) of the main transmission power P1 and the auxiliary transmission power P2. Accordingly, although each base channel fails in reception of the forward control command, it is possible to set the forward transmission powers P1 and P2 of the forward link to a nearly equal value between the base stations without exchange of information related to the forward transmission power between the base stations. In the manner described above, it is possible to obtain a similar effect in the second embodiment.

While this invention has thus far been described in conjunction with preferred embodiments thereof, it will now be readily possible for those skilled in the art to put this invention into various other manners. For example, although the SIR is measured in the base station in order to control the reverse transmission power of the reverse link in all of the above-mentioned embodiments, it may adopt another method which comprises the steps of measuring a desired wave power and of determining the reverse control command of the reverse transmission power for the mobile station so that the desired wave power has a constant value.

In addition, although each of the above-mentioned embodiments exemplifies a case where the forward control command for the forward transmission power control of the forward link, that the mobile station transmits to the base station, represents information related to changing of a relative value such as increment of the forward transmission power or decrement of the forward transmission power, the forward control command may represent an absolute amount without a relatively changing amount related to a control amount of the forward transmission power.

Furthermore, although description has been made about a case of carrying out the soft handover where the mobile station establishes channels with two base stations, this invention may be applicable in the similar manner to a case where the mobile station carries out the soft handover with three or more base stations.

In addition, in the above-mentioned embodiments, when the mobile station establishes channels with a plurality of base stations, all of the base stations controls the forward transmission powers in response to the forward control command transmitted from the mobile station so that the forward transmission powers are equal to one another among the base stations. However, each base station may have, as an internal transmission power value, a value of the forward transmission power which is controlled so as to be equalized among the base stations. In this event, the actual power transmitted from a part of the base stations may be temporarily increased or decreased on the basis of the internal transmission power value.

For example, in a case where a plurality of base stations transmit downward channel signals to one mobile station during execution of soft handover, the base station having a relatively larger propagation loss does not contribute to improvement of reception quality of the forward link in the mobile station although it simultaneously carries out transmission at the forward transmission power which is equal to that in other base stations. In addition, effect for increasing interference wave power for other mobile stations is similar to those in the other base stations. In order to restrain the interference wave power, the base station having a temporarily large propagation loss from the mobile station temporarily sets the forward transmission power to be small compared with the internal transmission power value. Otherwise, the base station turns the forward transmission power back to the internal transmission power value.

As another example, it will be assumed in a system in which the base station transmits the reverse control command for increasing or decreasing the reverse transmission power to the mobile station that a signal from the mobile station in the base station has an excess reception quality when the base station transmits the reverse control command for decreasing the reverse transmission power in the mobile station. In this event, the base station sets the forward transmission power to be large compared with the initial transmission power value. Otherwise, the base station turns the forward transmission power back to the initial transmission power value.

This invention is applicable in the entirely similar manner to a case where the forward transmission powers increasing or decreasing in response to the forward control command transmitted from the mobile station is set to the internal transmission power value so as to be equalized among the base stations in the manner of the above-mentioned methods. Accordingly, the transmission power control according to this invention is not only control of power itself radiated from the base antenna of the base station but also control of a value of the transmission power where the base station deals with the inside.

In addition, there is a system where information of a plurality of types such as a control command part and a data part is included in one time slot transmitted from the base station and the base station transmits the information at different powers in accordance with the types. It is possible in this invention not only to use the transmission power control of a part of such a time slot but also to use the transmission power control in a case of setting the same transmission power in all over the time slots.

In the second through the tenth embodiments described above, the base stations have the maximum transmission powers which are equal to one another and all of the cells have sizes which are equal to one another. However, this invention may be applicable to a cellular system where the base stations have the maximum transmission powers which are different from one another and the cells have sizes which are different from one another. In this event, the power transmitted from the base antenna is set to a value obtained by multiplying the transmission power defined in the above-mentioned embodiments by a coefficient defined in each base station in accordance with the maximum transmission power. When the coefficients defined in the respective base stations are different from one another, the transmission powers before multiplying the coefficients approach one another and the powers radiated from the base antennas have values which are different from one another. However, to set the transmission power to the value obtained by multiplying the coefficient defined by the base station is equivalent to a case where an amplifier or an attenuator is mounted on the base antenna or to variation of the propagation loss. Inasmuch as boundaries of the cells change in accordance with this, it is possible in the entirely similar manner to obtain diversity effect or the like according to this invention that is obtained in the boundaries of the cells.

What is claimed is:

1. A method of controlling transmission power in a cellular type mobile communication system comprising a plurality of cells, a plurality of base stations disposed in the respective cells, and a mobile station located in said cells, said mobile station carrying out communication with at least one base station by establishing a channel between said mobile station with said at least one base station, said method comprising the steps of:

receiving, in each base station, a control command for the transmission power from said mobile station while said mobile station establishes the channel with said at least one base station;

increasing or decreasing, in each base station, the transmission power in response to the control command; and renewing, in each base station, the transmission power so that the transmission power after being increased or decreased approaches a predetermined reference power.

2. A method as claimed in claim 1, wherein the predetermined reference power is equal to a maximum transmission power.

3. A method of controlling transmission power in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said method comprising the steps of:

repeatedly carrying out a first transmission power control operation where said mobile station transmits a control command for the transmission power to said at least one base station while said mobile station establishes the channel with said at least one base station and said at least one base station receives the control command to change the transmission power in response to the control command; and repeatedly carrying out a second transmission power control operation which renews the transmission power so that the transmission power for said base station approaches a predetermined reference power.

4. A method as claimed in claim 3, wherein the predetermined reference power is equal to a maximum transmission power.

5. A method of controlling transmission power in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said method comprising the steps of:

repeatedly carrying out a first transmission power control operation where said mobile station transmits a control command for the transmission power to said at least one base station while said mobile station establishes the channel with said at least one base station and said at least one base station receives the control command to change the transmission power in response to the control command; and repeatedly carrying out a second transmission power control operation which renews the transmission power in each base station so that the absolute value of the difference between a predetermined reference power in dB and the transmission power in dB decreases at a predetermined rate.

6. A method as claimed in claim 5, wherein the predetermined reference power is equal to a maximum transmission power.

7. A method of controlling transmission power in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said method comprising the steps of:

receiving, in each base station, a control command for the transmission power from said mobile station while said mobile station establishes channels with said plurality of stations;

increasing or decreasing, in each base station, the transmission power in response to the control command; and renewing, in each base station, the transmission power so that the transmission powers in said plurality of base stations after being increased or decreased have less differential and approach a reference power which is defined by said plurality of base stations in common.

8. A method as claimed in claim 7, wherein the reference power is equal to a maximum transmission power.

9. A method as claimed in claim 7, wherein the reference power is equal to an intermediate power between a maximum transmission power in dB and a minimum transmission power in dB.

10. A method as claimed in claim 7, wherein the reference power is equal to a minimum transmission power.

11. A method as claimed in claim 7, wherein said plurality of base stations simultaneously carry out a renewal of the transmission power.

12. A method of controlling transmission power in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said method comprising the steps of:

repeatedly carrying out a first transmission power control operation where said mobile station transmits a control command for the transmission power to said plurality of base stations while said mobile station establishes channels with said plurality of base stations and each of said plurality of base stations receives the control command to change the transmission power in response to the control command; and repeatedly carrying out a second transmission power control operation which renews the transmission power so that the transmission powers for said plurality of base stations have less differential and approach a reference power which is defined by said plurality of base stations in common.

13. A method as claimed in claim 12, wherein the reference power is equal to a maximum transmission power.

14. A method as claimed in claim 12, wherein the reference power is equal to an intermediate power between a maximum transmission power in dB and a minimum transmission power in dB.

15. A method as claimed in claim 12, wherein the reference power is equal to a minimum transmission power.

16. A method as claimed in claim 12, wherein said plurality of base stations simultaneously carry out a renewal of the transmission power.

17. A method of controlling transmission power in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said method comprising the steps of:

repeatedly carrying out a first transmission power control operation where said mobile station transmits a control command for the transmission power to each of said plurality of base stations while said mobile station establishes channels with said plurality of base stations and each of said plurality of base stations receives the control command to change the transmission power in response to the control command; and repeatedly carrying out a second transmission power control operation where each of said plurality of base stations renews the transmission power so that the absolute value of the difference between a reference power in dB defined by said plurality of base stations in common and the transmission power in dB decreases at a common rate in said plurality of base stations.

18. A method as claimed in claim 17, wherein the reference power is equal to a maximum transmission power.

19. A method as claimed in claim 17, wherein the reference power is equal to an intermediate power between a maximum transmission power in dB and a minimum transmission power in dB.

20. A method as claimed in claim 17, wherein the reference power is equal to a minimum transmission power.

21. A method as claimed in claim 17, wherein said plurality of base station simultaneously carry out a renewal of the respective transmission powers.

22. A base station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said base station comprising:

receiving means for receiving a control command for the transmission power from said mobile station while said mobile establishes the channel with said at least one base station;

changing means for changing the transmission power in response to the control command; and renewing means for renewing the transmission power so that the transmission power after being changed approaches a predetermined reference power.

23. A base station as claimed in claim 22, wherein the predetermined reference power is equal to a maximum transmission power.

24. A cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said cellular type mobile communication system comprising:

means for repeatedly carrying out a first transmission power control operation where said mobile station transmits a control command for the transmission power to said at least one base station while said mobile station establishes the channel with said at least one base station and said at least one base station receives the control command to change the transmission power in response to the control command; and means for repeatedly carrying out a second transmission power control operation which renews the transmission power so that the transmission power for said base station approaches a predetermined reference power.

25. A cellular type mobile communication system as claimed in claim 24, wherein the predetermined reference power is equal to a maximum transmission power.

26. A cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said cellular type mobile communication system comprising:

means for repeatedly carrying out a first transmission power control operation where said mobile station transmits a control command for the transmission power to said at least one base station while said mobile station establishes the channel with said at least one base station and said at least one base station receives the control command to change the transmission power in response to the control command; and means for repeatedly carrying out a second transmission power control operation which renews the transmission power in each base station so that the absolute value of the difference between a predetermined reference power in dB and the transmission power in dB decreases at a predetermined rate.

27. A cellular type mobile communication system as claimed in claim 26, wherein the predetermined reference power is equal to a maximum transmission power.

28. A base station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said base station comprising:

a receiving circuit for receiving a control command for the transmission power from said mobile station while said mobile station establishes the channel with said at least one base station;

a changing circuit for changing the transmission power in response to the control command; and a renewal circuit for renewing the transmission power so that the transmission power after being changed approaches a predetermined reference power.

29. A base station as claimed in claim 28, wherein the predetermined reference power is equal to a maximum transmission power.

30. A base station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said base station comprising:

a first transmission power controller for repeatedly carrying out a first transmission power control operation for changing the transmission power in response to a control command for the transmission power while said mobile station establishes the channel with said at least one base station, the control command being received from said mobile station; and a second transmission power controller for repeatedly carrying out a second transmission power control operation for renewing the transmission power so that the transmission power for said base station approaches a predetermined reference power.

31. A base station as claimed in claim 30, wherein the predetermined reference power is equal to a maximum transmission power.

32. A base station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said base station comprising:

a first transmission power controller for repeatedly carrying out a first transmission power control operation for changing the transmission power in response to a control command for the transmission power while said mobile station establishes the channel with said at least one base station, the control command being received from said mobile station; and a second transmission power controller for repeatedly carrying out a second transmission power control operation for renewing the transmission power so that the absolute value of the difference between a predetermined reference power in dB and the transmission power in dB decreases at a predetermined rate.

33. A base station as claimed in claim 32, wherein the predetermined reference power is equal to a maximum transmission power.

34. A base station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said base station comprising:

receiving means for receiving a control command for the transmission power from said mobile station while said mobile station establishes channels with said plurality of stations;

changing means for changing the transmission power in response to the control command; and renewing means for renewing the transmission power so that the transmission powers in said plurality of base stations after being changed have less differential and approach a reference power which is defined by said plurality of base stations in common.

35. A base station as claimed in claim 34, wherein the reference power is equal to a maximum transmission power.

36. A base station as claimed in claim 34, wherein the reference power is equal to an intermediate power between a maximum transmission power in dB and a minimum transmission power in dB.

37. A base station as claimed in claim 34, wherein the reference power is equal to a minimum transmission power.

38. A cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said cellular type mobile communication system comprising:

means for repeatedly carrying out a first transmission power control operation where said mobile station transmits a control command for the transmission power to said plurality of base stations while said mobile station establishes channels with said plurality of base stations and each of said plurality of base stations receives the control command to change the transmission power in response to the control command; and means for repeatedly carrying out a second transmission power control operation which renews the transmission power so that the transmission powers for said plurality of base stations have less differential and approach a reference power which is defined by said plurality of base stations in common.

39. A cellular type mobile communication system as claimed in claim 38, wherein the reference power is equal to a maximum transmission power.

40. A cellular type mobile communication system as claimed in claim 38, wherein the reference power is equal to an intermediate power between a maximum transmission power in dB and a minimum transmission power in dB.

41. A cellular type mobile communication system as claimed in claim 38, wherein the reference power is equal to a minimum transmission power.

42. A cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said cellular type mobile communication system comprising:

means for repeatedly carrying out a first transmission power control operation where said mobile station transmits a control command for the transmission power to each of said plurality of base stations while said mobile station establishes channels with said plurality of base stations and each of said plurality of base stations receives the control command to change the transmission power in response to the control command; and means for repeatedly carrying out a second transmission power control operation where each of said plurality of base stations renews the transmission power so that the absolute value of the difference between a reference power in dB defined by said plurality of base stations in common and the transmission power in dB decreases at a common rate in said plurality of base stations.

43. A cellular type mobile communication system as claimed in claim 42, wherein the reference power is equal to a maximum transmission power.

44. A cellular type mobile communication system as claimed in claim 42, wherein the reference power is equal to an intermediate power between a maximum transmission power in dB and a minimum transmission power in dB.

45. A cellular type mobile communication system as claimed in claim 42, wherein the reference power is equal to a minimum transmission power.

46. A base station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said base station comprising:

a receiving circuit for receiving a control command for the transmission power from said mobile station while said mobile station establishes channels with said plurality of stations;

a changing circuit for changing the transmission power in response to the control command; and a renewing circuit for renewing the transmission power so that the transmission powers in said plurality of base stations after being changed have less differential and approach a reference power which is defined by said plurality of base stations in common.

47. A base station as claimed in claim 46, wherein the reference power is equal to a maximum transmission power.

48. A base station as claimed in claim 46, wherein the reference power is equal to an intermediate power between a maximum transmission power in dB and a minimum transmission power in dB.

49. A base station as claimed in claim 46, wherein the reference power is equal to a minimum transmission power.

50. A base station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said base station comprising:

a first transmission power controller for repeatedly carrying out a first transmission power control operation for changing the transmission power in response to a control command for the transmission power while said mobile station establishes channels with said plurality of base stations, the control command being received from said mobile station; and a second transmission power controller for repeatedly carrying out a second transmission power control operation for renewing the transmission power so that the transmission powers for said plurality of base stations have less differential and approach a reference power which is defined by said plurality of base stations in common.

51. A base station as claimed in claim 50, wherein the reference power is equal to a maximum transmission power.

52. A base station as claimed in claim 50, wherein the reference power is equal to an intermediate power between a maximum transmission power in dB and a minimum transmission power in dB.

53. A base station as claimed in claim 50, wherein the reference power is equal to a minimum transmission power.

54. A base station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said base station comprising:

a first transmission power controller for repeatedly carrying out a first transmission power control operation for changing the transmission power in response to a control command for the transmission power while said mobile station establishes channels with said plurality of base stations, the control command being received from said mobile station; and a second transmission power controller for repeatedly carrying out a second transmission power control operation for renewing the transmission power so that the absolute value of the difference between a reference power in dB defined by said plurality of base stations in common and the transmission power in dB decreases at a common rate in said plurality of base stations.

55. A base station as claimed in claim 54, wherein the reference power is equal to a maximum transmission power.

56. A base station as claimed in claim 54, wherein the reference power is equal to an intermediate power between a maximum transmission power in dB and a minimum transmission power in dB.

57. A base station as claimed in claim 54, wherein the reference power is equal to a minimum transmission power.

58. A control station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said control station being connected to the plurality of base stations, said control station comprising:

receiving means, connected to the plurality of base stations, for receiving statistical values of the transmission powers from the respective base stations;

calculating means, connected to said receiving means, for calculating a reference value indicative of a reference transmission power using the statistical values;

transmitting means, connected to said calculating means and the plurality of base stations, for transmitting the reference value to the plurality of base stations.

59. A control station as claimed in claim 58, wherein said calculating means calculates, as the reference value, a maximum one of the statistical values.

60. A control station as claimed in claim 58, wherein said calculating means determines a common rate in accordance with mutual differences among the statistical values.

61. A control station as claimed in claim 58, wherein said calculating means determines frequency for renewing the transmission power by a common rate in accordance with mutual differences among the statistical values.

62. A control station for use in a cellular type mobile communication system comprising a plurality of cells, a plurality of base stations disposed in the respective cells, and a mobile station located in said cells, said mobile station carrying out communication with at least one base station by establishing a channel between said mobile station and said at least one base station, said control station being connected to the plurality of base stations, said control station comprising:

a receiving section, connected to the plurality of base stations, for receiving statistical values of the transmission powers from the respective base stations;

a calculating section, connected to said receiving section, for calculating a reference value indicative of a reference transmission power using the statistical values;

a transmitting section, connected to said calculating section and the plurality of base stations, for transmitting the reference value to the plurality of base stations.

63. A control station as claimed in claim 62, wherein said calculating section calculates, as the reference value, a maximum one of the statistical values.

64. A control station as claimed in claim 62, wherein said calculating section determines a common rate in accordance with mutual differences among the statistical values.

65. A control station as claimed in claim 62, wherein said calculating section determines frequency for renewing the transmission power by a common rate in accordance with mutual differences among the statistical values.

* * * * *